(12) United States Patent
Hughes et al.

(10) Patent No.: US 7,572,133 B2
(45) Date of Patent: Aug. 11, 2009

(54) SEPARABLE LOADBREAK CONNECTOR AND SYSTEM

(75) Inventors: David Charles Hughes, Rubicon, WI (US); Brian Todd Steinbrecher, Brookfield, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 11/688,648

(22) Filed: Mar. 20, 2007

(65) Prior Publication Data

US 2007/0293073 A1    Dec. 20, 2007

Related U.S. Application Data

(63) Continuation-in-part of application No. 11/273,192, filed on Nov. 14, 2005, now Pat. No. 7,488,916.

(51) Int. Cl.
*H01R 13/53* (2006.01)
(52) U.S. Cl. ........................................................ 439/181
(58) Field of Classification Search ......... 439/181–188, 439/921, 582, 507, 784, 805, 135, 148, 843
See application file for complete search history.

(56) References Cited

U.S. PATENT DOCUMENTS

| | | |
|---|---|---|
| 1,903,956 A | 4/1933 | Christie et al. |
| 2,953,724 A | 9/1960 | Hilfiker et al. |
| 3,115,329 A | 12/1963 | Wing et al. |
| 3,315,132 A | 4/1967 | Raymond |
| 3,392,363 A | 7/1968 | Geis, Jr. et al. |
| 3,471,669 A | 10/1969 | Curtis |
| 3,474,386 A | 10/1969 | Link |
| 3,509,516 A | 4/1970 | Phillips |
| 3,509,518 A | 4/1970 | Phillips |
| 3,513,425 A | 5/1970 | Arndt |
| 3,539,972 A | 11/1970 | Silva et al. |
| 3,542,986 A | 11/1970 | Kotski |
| 3,546,535 A | 12/1970 | Van Riemsdijk |
| 3,576,493 A | 4/1971 | Tachick et al. |
| 3,594,685 A * | 7/1971 | Cunningham ............... 439/480 |
| 3,652,975 A | 3/1972 | Keto |
| 3,654,590 A | 4/1972 | Brown |
| 3,663,928 A | 5/1972 | Keto |
| 3,670,287 A | 6/1972 | Keto |
| 3,678,432 A | 7/1972 | Boliver |
| 3,720,904 A | 3/1973 | De Sio |
| 3,725,846 A | 4/1973 | Strain |
| 3,740,503 A | 6/1973 | Tomohiro et al. |
| 3,740,511 A | 6/1973 | Westmoreland |

(Continued)

FOREIGN PATENT DOCUMENTS

DE    3110609    10/1982

(Continued)

OTHER PUBLICATIONS

U.S. Appl. No. 11/809,508, Hughes et al.

(Continued)

*Primary Examiner*—Edwin A. Leon
(74) *Attorney, Agent, or Firm*—King & Spalding LLP

(57) ABSTRACT

Separable loadbreak connectors include an overlapping insulation joint and interchangeable preconfigured connector assemblies.

38 Claims, 11 Drawing Sheets

U.S. PATENT DOCUMENTS

| | | |
|---|---|---|
| 3,798,586 A | 3/1974 | Huska |
| 3,826,860 A | 7/1974 | De Sio et al. |
| 3,845,233 A | 10/1974 | Burton |
| 3,860,322 A | 1/1975 | Sankey et al. |
| 3,915,534 A | 10/1975 | Yonkers |
| 3,924,914 A | 12/1975 | Banner |
| 3,945,699 A | 3/1976 | Westrom |
| 3,949,343 A | 4/1976 | Yonkers |
| 3,953,099 A | 4/1976 | Wilson |
| 3,955,874 A | 5/1976 | Boliver |
| 3,957,332 A | 5/1976 | Lambert, III |
| 3,960,433 A | 6/1976 | Boliver |
| 4,029,380 A | 6/1977 | Yonkers |
| 4,040,696 A | 8/1977 | Wada et al. |
| 4,067,636 A | 1/1978 | Boliver et al. |
| 4,088,383 A | 5/1978 | Fischer et al. |
| 4,102,608 A | 7/1978 | Balkau et al. |
| 4,103,123 A | 7/1978 | Marquardt |
| 4,107,486 A | 8/1978 | Evnas |
| 4,113,339 A | 9/1978 | Eley |
| 4,123,131 A | 10/1978 | Pearce, Jr. et al. |
| 4,152,643 A | 5/1979 | Schweitzer |
| 4,154,993 A | 5/1979 | Kumbera et al. |
| 4,161,012 A | 7/1979 | Cunningham |
| 4,163,118 A | 7/1979 | Marien et al. |
| 4,186,985 A | 2/1980 | Stepniak et al. |
| 4,203,017 A | 5/1980 | Lee |
| 4,210,381 A | 7/1980 | Borgstrom |
| 4,223,179 A | 9/1980 | Lusk et al. |
| 4,260,214 A | 4/1981 | Dorn |
| 4,343,356 A | 10/1982 | Riggs et al. |
| 4,353,611 A | 10/1982 | Siebens et al. |
| 4,354,721 A | 10/1982 | Luzzi |
| 4,360,967 A | 11/1982 | Luzzi et al. |
| 4,443,054 A | 4/1984 | Ezawa et al. |
| 4,463,227 A | 7/1984 | Dizon et al. |
| 4,484,169 A | 11/1984 | Nishikawa |
| 4,500,935 A | 2/1985 | Tsuruta et al. |
| 4,508,413 A | 4/1985 | Bailey |
| 4,568,804 A | 2/1986 | Leuhring |
| 4,600,260 A | 7/1986 | Stepniak et al. |
| 4,626,755 A | 12/1986 | Butcher et al. |
| 4,638,403 A | 1/1987 | Amano et al. |
| 4,678,253 A | 7/1987 | Hicks et al. |
| 4,688,013 A | 8/1987 | Nishikawa et al. |
| 4,700,258 A | 10/1987 | Farmer |
| 4,715,104 A | 12/1987 | Schoenwetter et al. |
| 4,722,694 A | 2/1988 | Makal et al. |
| 4,767,894 A | 8/1988 | Schombourg |
| 4,767,941 A | 8/1988 | Brand et al. |
| 4,779,341 A | 10/1988 | Roscizewski |
| 4,793,637 A | 12/1988 | Laipply et al. |
| 4,799,895 A | 1/1989 | Borgstrom |
| 4,820,183 A | 4/1989 | Knapp et al. |
| 4,822,291 A | 4/1989 | Cunningham |
| 4,822,951 A | 4/1989 | Wilson et al. |
| 4,834,677 A | 5/1989 | Archang |
| 4,857,021 A | 8/1989 | Boliver et al. |
| 4,863,392 A | 9/1989 | Borgstrom et al. |
| 4,867,687 A | 9/1989 | Williams et al. |
| 4,871,888 A | 10/1989 | Bestel |
| 4,891,016 A | 1/1990 | Luzzi et al. |
| 4,911,655 A | 3/1990 | Pinyan et al. |
| 4,946,393 A | 8/1990 | Borgstrom et al. |
| 4,955,823 A | 9/1990 | Luzzi |
| 4,972,049 A | 11/1990 | Muench |
| 4,982,059 A | 1/1991 | Bestel |
| 5,025,121 A | 6/1991 | Allen et al. |
| 5,045,656 A | 9/1991 | Kojima |
| 5,045,968 A | 9/1991 | Suzuyama et al. |
| 5,053,584 A | 10/1991 | Chojnowski |
| 5,101,080 A | 3/1992 | Ferenc |
| 5,114,357 A | 5/1992 | Luzzi |
| 5,128,824 A | 7/1992 | Yaworski et al. |
| 5,130,495 A | 7/1992 | Thompson |
| 5,166,861 A | 11/1992 | Krom |
| 5,175,403 A | 12/1992 | Hamm et al. |
| 5,213,517 A | 5/1993 | Kerek et al. |
| 5,221,220 A | 6/1993 | Roscizewski |
| 5,230,142 A | 7/1993 | Roscizewski |
| 5,230,640 A | 7/1993 | Tardif |
| 5,248,263 A | 9/1993 | Sakurai et al. |
| 5,266,041 A | 11/1993 | De Luca |
| 5,277,605 A | 1/1994 | Roscizewski et al. |
| 5,356,304 A | 10/1994 | Colleran |
| 5,358,420 A | 10/1994 | Cairns et al. |
| 5,359,163 A | 10/1994 | Woodard |
| 5,393,240 A | 2/1995 | Makal et al. |
| 5,422,440 A | 6/1995 | Palma |
| 5,427,538 A | 6/1995 | Knapp et al. |
| 5,429,519 A | 7/1995 | Murakami et al. |
| 5,433,622 A | 7/1995 | Galambos |
| 5,435,747 A | 7/1995 | Franckx et al. |
| 5,445,533 A | 8/1995 | Roscizewski et al. |
| 5,468,164 A | 11/1995 | Demissy |
| 5,492,487 A | 2/1996 | Cairns et al. |
| 5,525,069 A * | 6/1996 | Roscizewski et al. ....... 439/184 |
| 5,589,671 A | 12/1996 | Hackbarth et al. |
| 5,619,021 A | 4/1997 | Yamamoto et al. |
| 5,641,310 A | 6/1997 | Tiberio, Jr. |
| 5,655,921 A | 8/1997 | Makal et al. |
| 5,661,280 A | 8/1997 | Kuss et al. |
| 5,667,060 A | 9/1997 | Luzzi |
| 5,717,185 A | 2/1998 | Smith |
| 5,736,705 A | 4/1998 | Bestel et al. |
| 5,737,874 A | 4/1998 | Sipos et al. |
| 5,747,765 A | 5/1998 | Bestel et al. |
| 5,747,766 A | 5/1998 | Waino et al. |
| 5,757,260 A | 5/1998 | Smith et al. |
| 5,766,030 A | 6/1998 | Suzuki |
| 5,766,517 A | 6/1998 | Goedde et al. |
| 5,795,180 A | 8/1998 | Siebens |
| 5,808,258 A | 9/1998 | Luzzi |
| 5,816,835 A | 10/1998 | Meszaros |
| 5,846,093 A | 12/1998 | Muench et al. |
| 5,857,862 A | 1/1999 | Muench et al. |
| 5,864,942 A | 2/1999 | Luzzi |
| 5,912,604 A | 6/1999 | Harvey et al. |
| 5,917,167 A | 6/1999 | Bestel |
| 5,936,825 A | 8/1999 | DuPont |
| 5,949,641 A | 9/1999 | Walker et al. |
| 5,953,193 A | 9/1999 | Ryan |
| 5,957,712 A | 9/1999 | Stepniak |
| 6,022,247 A | 2/2000 | Akiyama et al. |
| 6,040,538 A | 3/2000 | French et al. |
| 6,042,407 A | 3/2000 | Scull et al. |
| 6,069,321 A | 5/2000 | Wagener et al. |
| 6,130,394 A | 10/2000 | Hogl |
| 6,168,447 B1 | 1/2001 | Stepniak et al. |
| 6,205,029 B1 | 3/2001 | Byre et al. |
| 6,213,799 B1 | 4/2001 | Jazowski et al. |
| 6,220,888 B1 | 4/2001 | Correa |
| 6,227,908 B1 | 5/2001 | Aumeier |
| 6,250,950 B1 | 6/2001 | Pallai |
| 6,280,659 B1 | 8/2001 | Sundin |
| 6,332,785 B1 | 12/2001 | Muench, Jr. et al. |
| 6,338,637 B1 | 1/2002 | Muench, Jr. et al. |
| 6,362,445 B1 | 3/2002 | Mearchland et al. |
| 6,364,216 B1 | 4/2002 | Martin |
| 6,416,338 B1 | 7/2002 | Berlovan |
| 6,453,776 B1 | 9/2002 | Beattie et al. |
| 6,504,103 B1 | 1/2003 | Meyer et al. |
| 6,517,366 B2 | 2/2003 | Bertini et al. |
| 6,520,795 B1 | 2/2003 | Jazowski |

| | | |
|---|---|---|
| 6,538,312 B1 | 3/2003 | Peterson et al. |
| 6,542,056 B2 | 4/2003 | Nerstron et al. |
| 6,566,996 B1 | 5/2003 | Douglass et al. |
| 6,585,531 B1 | 7/2003 | Stepniak et al. |
| 6,664,478 B2 | 12/2003 | Mohan et al. |
| 6,674,159 B1 | 1/2004 | Peterson et al. |
| 6,689,947 B2 | 2/2004 | Ludwig |
| 6,705,898 B2 | 3/2004 | Pechstein et al. |
| 6,709,294 B1 | 3/2004 | Cohen et al. |
| 6,733,322 B2 | 5/2004 | Boemmel et al. |
| 6,744,255 B1 | 6/2004 | Steinbrecher et al. |
| 6,790,063 B2 | 9/2004 | Jazowski et al. |
| 6,796,820 B2 | 9/2004 | Jazowski et al. |
| 6,809,413 B1 | 10/2004 | Peterson et al. |
| 6,811,418 B2 | 11/2004 | Jazowski et al. |
| 6,830,475 B2 | 12/2004 | Jazowski et al. |
| 6,843,685 B1 | 1/2005 | Borgstrom et al. |
| 6,888,086 B2 | 5/2005 | Daharsh et al. |
| 6,905,356 B2 | 6/2005 | Jazowski et al. |
| 6,936,947 B1 | 8/2005 | Leijon et al. |
| 6,939,151 B2 | 9/2005 | Borgstrom et al. |
| 6,972,378 B2 | 12/2005 | Schomer et al. |
| 6,984,791 B1 | 1/2006 | Meyer et al. |
| 7,018,236 B2 | 3/2006 | Nishio et al. |
| 7,019,606 B2 | 3/2006 | Williams et al. |
| 7,044,760 B2 | 5/2006 | Borgstrom et al. |
| 7,044,769 B2 | 5/2006 | Zhao et al. |
| 7,050,278 B2 | 5/2006 | Poulsen |
| 7,059,879 B2 | 6/2006 | Krause et al. |
| 7,077,672 B2 | 7/2006 | Krause et al. |
| 7,079,367 B1 | 7/2006 | Liljestrand |
| 7,083,450 B1 | 8/2006 | Hughes |
| 7,104,822 B2 | 9/2006 | Jazowski et al. |
| 7,104,823 B2 | 9/2006 | Jazowski et al. |
| 7,108,568 B2 | 9/2006 | Jazowski et al. |
| 7,134,889 B2 | 11/2006 | Hughes et al. |
| 7,150,098 B2 | 12/2006 | Borgstrom et al. |
| 7,168,983 B2 | 1/2007 | Graf et al. |
| 7,170,004 B2 | 1/2007 | Gramespacher et al. |
| 7,182,647 B2 | 2/2007 | Muench et al. |
| 7,212,389 B2 | 5/2007 | Hughes |
| 7,216,426 B2 | 5/2007 | Borgstrom et al. |
| 7,234,980 B2 | 6/2007 | Jazowski et al. |
| 7,247,061 B2 | 7/2007 | Hoxha et al. |
| 7,247,266 B2 | 7/2007 | Bolcar |
| 7,258,585 B2 | 8/2007 | Hughes et al. |
| 7,278,889 B2 | 10/2007 | Muench et al. |
| 7,341,468 B2 | 3/2008 | Hughes et al. |
| 2001/0008810 A1 | 7/2001 | George et al. |
| 2002/0055290 A1 | 5/2002 | Jazowski et al. |
| 2003/0228779 A1 | 12/2003 | Jazowski et al. |
| 2004/0121657 A1 | 6/2004 | Muench et al. |
| 2004/0242034 A1 | 12/2004 | Rinehart et al. |
| 2005/0208808 A1 | 9/2005 | Jazowski et al. |
| 2005/0212629 A1 | 9/2005 | William et al. |
| 2005/0260876 A1 | 11/2005 | Krause et al. |
| 2006/0110983 A1 | 5/2006 | Muench et al. |
| 2006/0160388 A1 | 7/2006 | Hughes et al. |
| 2006/0216992 A1 | 9/2006 | Hughes |
| 2007/0026713 A1 | 2/2007 | Hughes et al. |
| 2007/0026714 A1 | 2/2007 | Hughes et al. |
| 2007/0032110 A1 | 2/2007 | Hughes et al. |
| 2007/0097601 A1 | 5/2007 | Hughes et al. |
| 2007/0108164 A1 | 5/2007 | Muench et al. |

FOREIGN PATENT DOCUMENTS

| | | |
|---|---|---|
| DE | 3521365 | 2/1987 |
| DE | 19906972 A1 | 2/1999 |
| EP | 0624940 | 11/1994 |
| EP | 0782162 A2 | 7/1997 |
| EP | 0957496 | 11/1999 |
| FR | 2508729 | 12/1982 |
| GB | 105227 | 2/1918 |
| GB | 2254493 | 10/1992 |
| JP | S62-198677 | 12/1987 |
| JP | S63-93081 | 6/1988 |
| JP | H1-175181 | 7/1989 |
| JP | H3-88279 | 9/1991 |
| JP | H4-54164 | 5/1992 |
| WO | WO 00/41199 | 7/2000 |

OTHER PUBLICATIONS

U.S. Appl. No. 11/738,995, Steinbrecher et al.
U.S. Appl. No. 11/738,948, Hughes et al.
U.S. Appl. No. 11/738,941, Hughes et al.
U.S. Appl. No. 11/688,673, Hughes et al.
U.S. Appl. No. 11/688,648, Hughes et al.
U.S. Appl. No. 11/677,703, Hughes et al.
U.S. Appl. No. 11/676,861, Hughes et al.
Loadbreak Apparatus Connectors Service Information 500-26, Cooper Power Systems, May 2003, Waukesha, WI.
Deadbreak Apparatus Connectors Electrical Apparatus, Cooper Power Systems, Jul. 1999, Marketing Material.
Link-Op 600A Operable Connector System, Marketing Material.
Installation Instructions, 650LK-B Link Operable Connector System (Bolted) May 1, 1989.
G&W Electric Co.; "Breakthrough in Switching Technology; Solid Dielectric Switchgear"; Oct. 2001; Blue Island, IL. cited by other .
Cooper Power Systems; "Padmounted Switchgear; Type RVAC, Vacuum-Break Switch, Oil-Insulated or SF.sub.6-Insulated; Electrical Apparatus 285-50"; Jul. 1998. cited by other .
Cooper Power Systems; "Padmounted Switchgear; Type MOST Oil Switch; Electrical Apparatus 285-20"; Jul. 1998. cited by other .
Cooper Power Systems; "Molded Rubber Products; 600 A 35 kV Class Bol-T.TM. Deadbreak Connector; Electrical Apparatus 600-50"; Jan. 1990. cited by other .
Cooper Power Systems; "Padmounted Switchgear; Kyle.RTM. Type VFI Vacuum Fault Interrupter; Electrical Apparatus 285-10", Jan. 1998. cited by other .
"Loadbreak Appatus Connectors, 200 A 25kV Class—Expanded Range Loadbreak Elbow Connector, Electrical Apparatus 500-28"; Cooper Power Systems; pp. 1-4; (Jan. 2004). cited by other .
Kevin Fox, "The Cooper Posi-Break.TM. Solution to Separable Connector Switching Problems at Wisconsin Electric Power Company," Component Products, Bulletin No. 98065, copyright 1998 Cooper Power Systems, MI 10/98 5M, 2 total pages. cited by other .
"The Cooper Posi-Break.TM., Elbow and Cap, Engineered Solution Increases Strike Distance and Improves Reliability," copyright 1998 Cooper Power Systems, Inc., Bulletin 98014, MI 398/15M, 6 total pages. cited by other.
Loadbreak Apparatus Connectors, "200 A 25 kV Class Loadbreak Bushing Insert," Service Information 500-26, Cooper Power Systems, May 2003, pp. 1-2. cited by other .
Loadbreak Apparatus Connectors, "200 A kV Class Cooper Posi-Break.TM. Expanded Range Loadbreak Elbow Connector," Service Information 500-29, Cooper Power Systems, Jan. 2004, pp. 1-4. cited by other .
Product Brief, "Latched Elbow Indicator," Cooper Power Systems, Bulletin 94014, Apr. 1994, 1 total page. cited by other .
"Stick-OPerable 600-Amp Connector Systems," *Elastimold, Amerace Corporation*, Feb. 1984, 11 pages.
"Molded Rubber Products, 600 A 15 kV Class T-OP™ II Deadbreak Connector Electrical Apparatus 600-12," *Cooper Power Systems*, Jul. 2005, pp. 1-4.
"Molded Rubber Products, 600 A 15 and 25 kV Deadbreak Accessories, Tools, Replacement Parts Electrical Apparatus 600-46"; *Cooper Power Systems*, Jul. 1997, pp. 1-4.
"Molded Rubber Products, 600 A 25 kV Class BT-TAP™ Deadbreak Connector Electrical Apparatus, 600-35," *Cooper Power Systems*, Mar. 2003, pp. 1-5.
"Deadbreak Apparatus Connectors, 600 A 15/25 kV Class Bol-T™ Deadbreak Connector Electrical Apparatus 600-10," *Cooper Power Systems*, Aug. 2002, 6 pages.

"Deadbreak Apparatus Connector, 600 A 25 kV Class Bushing Adapter for T-OP™ II Connector Systems (including LRTP and Bushing Extender) Electrical Apparatus 600-38," *Cooper Power Systems*, Jun. 1997, pp. 1-4.

"Loadbreak Apparatus Connectors, 200 A 15 kV Class Loadbreak Bushing Insert 500-12," *Cooper Power Systems*, Nov. 1995, pp. 1-2.

"T-OP™ II: How Many Sticks Does It Take To Operate Your 600 Amp Terminator System?," *Cooper Power Systems*, Jul. 1994, 4 pages.

"Installation & Operation Instructions 168ALR, Access Port Loadbreak Elbow Connectors"; *Elastimold IS-168ALR (Rev C)*; pp. 1-5; (Feb. 1, 1994).

"Operating Instructions 200TC-2"; *Elastimold IS-200TC (Rev-A)*; pp. 1-2; (Feb. 26, 1995).

"Surge Arresters"; *Elastimold Catalog*; pp. 26-27; (2001).

"Surge Arresters, Metal Oxide Varistor elbow (M.O.V.E.™) Surge Arrester Electrical Apparatus 235-65"; *Cooper Power Systems*; pp. 1-4; Dec. 2003.

"Surge Arresters, Metal Oxide Elbow Surge Arrester Electrical Apparatus 235-65"; *Cooper Power Systems*; pp. 1-4; Jan. 1991.

"Surge Arrester, Metal Oxide Varistor (MOV) Parking Stand Surge Arrester Electrical Apparatus 235-68"; *Cooper Power Systems*; pp. 1-3; Apr. 2002.

"INJPLUG35, 35 kV Amp Loadbreak Injection Plug Operating and Installation Instructions"; *Cooper Power Systems*; p. 1; (Sep. 2002).

"Loadbreak Apparatus Connectors, 200 A 15 kV Class Loadbreak Elbow Connector, Electrical Apparatus 500-10"; *Cooper Power Systems*; pp. 1-4; (Feb. 2004).

"Loadbreak Apparatus Connectors, 200 A 15 kV and 25 kV Class Elbow Installation Instructions, Service Information S500-10-1"; *Cooper Power Systems*; pp. 1-4; (Feb. 2001).

"Loadbreak Apparatus Connectors, 200 A 15kV Class Loadbreak Bushing Insert 500-12"; *Cooper Power Systems*; pp. 1-2; (Nov. 1995).

"Loadbreak Apparatus Connectors, 200 A 15kV Class Loadbreak Rotatable Feedthru Insert; Electrical Apparatus 500-13"; *Cooper Power Systems*; pp. 1-2; (Apr. 2001).

"Loadbreak Apparatus Connectors, 200 A 25 kV Class—Expanded Range Loadbreak Elbow Connector, Electrical Apparatus 500-28"; *Cooper Power Systems*; pp. 1-4; (Jan. 2004).

"Loadbreak Apparatus Connectors, 200 A 25 kV Class Rotatable Feedthru Insert, Electrical Apparatus 500-30"; *Cooper Power Systems*; pp. 1-2; (Jun. 1999).

"Loadbreak Apparatus Connectors, 200 A 35 kV Class Three-Phase Loadbreak Injection Elbow Installation Instructions, Service Information S500-55-2"; *Cooper Power Systems*; pp. 1-6; (Apr. 1999).

Cooper Power Systems, *Deadbreak Apparatus Connectors*, "600 A 15/25 kV Clas Bol-T™ Deadbreak Connector", Electrical Apparatus 600-30, pp. 1-6, Feb. 2003.

Cooper Power Systems, *Deadbreak Apparatus Connectors*, "600 A 15/25 kV Class PUSH-OP® Deadbreak Connector", Electrical Apparatus 600-33, pp. 1-4, Nov. 2004.

Cooper Power systems, *Molded Rubber Products*, "600 A 15/25 kV Class T-OP™ II Deadbreak Connector", Electrical Apparatus 600-32, pp. 1-4, Jul. 2005.

Cooper Power Systems, *OEM Equipment*, "Four-Position Sectionalizing Loadbreak Switches", Electrical Apparatus 800-64, pp. 1-8, Dec. 2003.

* cited by examiner

SEPARABLE LOADBREAK CONNECTOR AND SYSTEM

CROSS REFERENCE TO RELATED APPLICATIONS

This application is a continuation-in-part application of U.S. application Ser. No. 11/273,192 filed Nov. 14, 2005 now U.S. Pat. No. 7,488,916, the disclosure of which is hereby incorporated by reference in its entirety.

BACKGROUND OF THE INVENTION

This invention relates generally to bus systems and cable connectors for electric power systems, and more particularly to separable insulated loadbreak connector systems for use with modular bus systems.

Electrical power is typically transmitted from substations through cables which interconnect other cables and electrical apparatus in a power distribution network. The cables are typically terminated on bushings that may pass through walls of metal encased equipment such as capacitors, transformers or switchgear.

Separable loadbreak connectors allow connection or disconnection of the cables to the electrical apparatus for service, repair, or expansion of an electrical distribution system. Such connectors typically include a contact tube surrounded by elastomeric insulation and a semiconductive ground shield. Insulated connector probe sleeves are cylindrical with a very small bonding area at the bottom portion of the interface cylinder. A contact piston is located in the contact tube, and a female contact having contact fingers is coupled to the piston. An arc interrupter, gas trap and arc-shield are also mounted to the contact tube. The female contact fingers are matably engaged with an energized male contact of a mating bushing, typically an elbow connector, to connect or disconnect the power cables from the apparatus. The piston is movable within the contact tube to hasten the closure of the male and female contacts and thus extinguish any arc created as they are engaged.

The connectors are coupled to various sized and shaped pieces of bus work to complete the interconnection. Typically the bus work comprises bus bars sized at the site of assembly to account for various configurations of cable risers that carry cables to the electrical switchgear. Such variety of component pieces makes repair or replacement of the components laborious in that each piece is generally custom made and assembled. Insulation is provided between the bus bars and the active switching elements to prevent electrical arcing. There are three common types of insulation typically used in conventional switchgear: oil, sulfur hexafluoride ($SF_6$) gas, and air. Each type of insulation insulates each part of the switchgear from the other parts of the switchgear (bus bar and active switching elements), and from the outer surfaces of the container of the switchgear. However, $SF_6$ gas is difficult to contain, air requirements excessive spacing between energized parts to be an effective insulator, and oil is also difficult to contain and is a fire hazard.

To increase a flashover distance between energized portions and grounded portions of the connector some known connectors are insulated using layers of insulative material covering a length of the energized portion and/or a semiconductive portion. For example, an insulative layer may be disposed within the recess of the connector along an inner surface. A probe assembly may be contained within the connector and aligned down the axis of the recess. An insulative sheath covers a portion of the exterior of the probe. The insulative sheath surrounding the probe and the insulative layer covering the inner surface of the housing are formed separately and insulative layer is expected to bond securely to insulative sheath at an abutting joint. However, if the abutting joint is not abutted and securely bonded, a gap between the insulative sheath and the insulative layer permits shorting the flashover distance between the energized contact extension and ground potential at an opening end of interface.

DETAILED DESCRIPTION OF THE INVENTION

Figure 1:
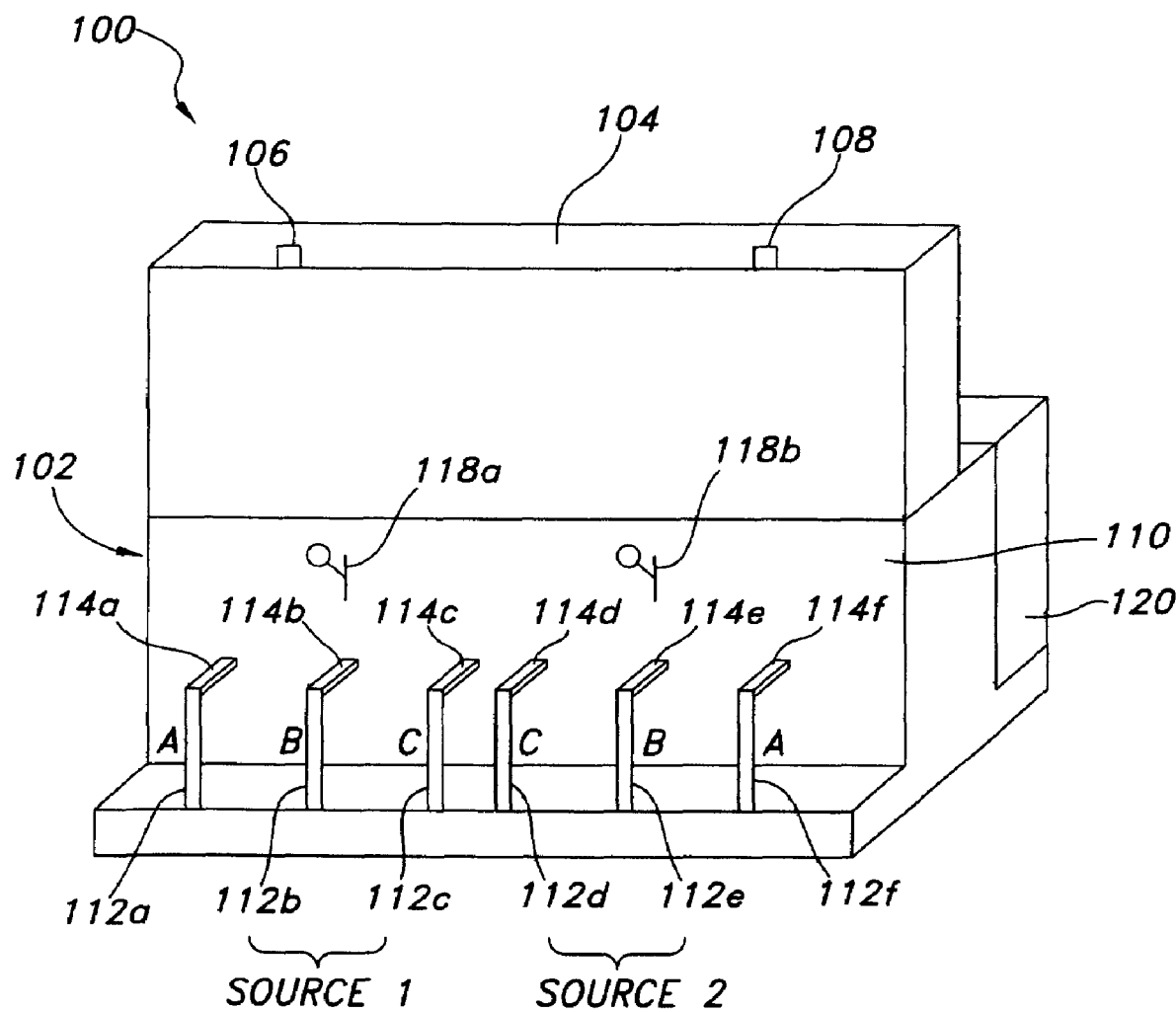
FIG. 1 illustrates an exemplary switchgear configuration.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

I. Introduction to the Invention

High-voltage separable connectors interconnect sources of energy such as transformers to distribution networks or the like. Frequently, it is necessary to connect and disconnect the electrical connectors. These connectors typically feature an elbow component, which contains a male connector, and a bushing component, which contains a female connector. When the components are connected, elastomeric O-rings seal the connection.

Disconnecting energized connectors is an operation known as a loadbreak. A problem known as "flashover" has been known to occur while switching or separating loadbreak separable connectors. The male connector probe is typically maintained within the elbow, and the female connector contact is contained within the bushing. During a loadbreak operation, the elbow is pulled from the bushing using a hotstick to separate the components. This, in effect, creates an open circuit. During separation, a phenomenon known as a flashover may occur where an arc from the energized connector extends rapidly to a nearby ground. Existing connector designs contain a number of arc extinguishing components so that the devices can have loadbreak operations performed under energized conditions with no flashover to ground occurring. The object of caution is to control the arc and gases generated during loadmake and loadbreak operations. Even with these precautions, however, flashovers have occurred on rare occasions. In a flashover, an arc extends from an energized portion of one of the connectors and seeks a nearby ground. Flashovers commonly occur during the initial approximate one-inch of separation of the connectors from each other. The separation of the elbow from the bushing causes a partial vacuum to surround the energized components of the connector assembly. Because a partial vacuum presents a lower dielectric strength than that of air at atmospheric pressure, a flashover is more likely to occur at the moment as the elastomeric seal between the components is broken and before atmospheric pressure is reestablished around the energized portions of the components. Also, after being connected over a long period of time, the elbow may adhere to the bushing interface so that the connectors cannot be easily disengaged. This is known as a stuck condition, and greater force is required to separate the elbow resulting in a more rapid change in pressure and dielectric strength in the air surrounding the energized components.

During a flashover, an electrical arc between the energized components and ground may result which could cause damage to the equipment and possibly create a power outage. The problem of flashovers involves principally 25 KV and 35 KV loadbreak connectors but may also include 15 KV connectors. In a solid dielectric insulated vacuum switch or interrupter device, insulating layers keep internal conductive elements of the device, which may be energized at either high voltage or electrically grounded, electrically isolated from each other. Furthermore, an external ground shield is sometimes, but not necessarily, provided to maintain outer surfaces of the device at ground potential for safety reasons. This ground shield must also be electrically isolated from the energized components. Electrical isolation between potentials is necessary to prevent faults in the electrical system. In some cases, layers of electrical insulation may separate from each other due to manufacturing techniques that permit joining the layers in a less robust way. Damage to the device itself or to surrounding equipment is also prevented, and people in the vicinity of the switchgear, including but not limited to maintenance workers and technicians, are protected from hazardous conditions. Providing such insulation in a cost effective manner so as to allow the device to withstand the applied voltage and to isolate the circuit when the switch contacts are in the open position is a challenge.

Utility companies distribute power to customers using a network of cables, switching stations and switchgear. Switchgear is high voltage (e.g. 5 kV-38 kV) equipment, typically subsurface, vault, or pad mounted and used to distribute and control power distribution in relatively small areas. Historically, switchgear is a box or container that includes bushings, insulation, a bus bar system and a collection of active switching elements. An active switching element is a device with an internal active component, such as a fuse, a switch, or an interrupter, and external points of connection. In some active switching elements, these external points of connection are bushings. Active switching elements are used to automatically, manually, or remotely open and/or close a circuit. It should be noted that active switching elements that include switches or interrupters often include contacts in a vacuum, air, insulating oil, or dielectric gas. Distribution cables are coupled to the bushings of the switchgear and have the capacity to transmit power at high voltages. The bushings in turn are coupled to, or form an integral part of, the active switching elements inside the switchgear. The active switching elements are coupled by a bus bar system to create the switchgear.

A mechanical connector connects two or more metallic elements by using threaded, crimp, or wedge connections. Typical mechanical bus connections consist of two or more conductors made from bars or braids which are secured together with a threaded bolt extending through holes in a flattened portion and secured by a bolt and a conductive member with internal threads. A typical mechanical connector to a flat bus conductor surface is accomplished by threading a conductive member with internal threads onto a threaded stud or a bolt. Push-on connectors consist of two or more metallic bus conductors that can be axially joined. The components consist of a matching set of probes, rods, or 'male' conductors that mate with finger-contacts, bores, or 'female' conductors or contacts.

A conventional bus bar system generally includes electrically conductive metal bars that are formed or bent around each other to maintain electrical clearance with respect to each phase. The metal bars may be flexible or partially flexible to allow connection to two rigid members. The purpose of bus bar system is to conduct power from the source side active switching elements to the tap side active switching elements. Thus, if one of the active switching elements opens such that a source side or tap side cable is disconnected from the bus bar system, the remaining source and tap side cables remain connected and can transmit power.

Insulation is provided between the bus bars and the active switching elements to prevent electrical arcing. There are three common types of insulation typically used in conventional switchgear: oil, sulfur hexafluoride ($SF_6$) gas, and air. Each type of insulation insulates each part of the switchgear from the other parts of the switchgear (bus bar and active switching elements), and from the outer surfaces of the container of the switchgear.

It is desirable to provide a mounting structure and insulation for vacuum switch or interrupter devices and bus connecting systems that improves reliability of the switchgear as the contacts are opened and closed, simplifies manufacture and assembly of the devices and associated switchgear, and provides cost advantages in relation to known switch or interrupter devices and associated switchgear.

II. Inventive Switchgear Systems And Modules

FIG. 1 illustrates an exemplary switchgear configuration 100. While one exemplary switchgear 100 is described, it is understood that the benefits of the invention accrue generally to switchgear of many configurations, and that the switchgear 100 is but one potential application of the switch or interrupter assemblies described hereinbelow. Switchgear 100 is therefore illustrated and described herein for illustrative purposes only, and the invention is not intended to be limited to any particular type of switchgear configuration, such as the switchgear 100.

Figure 2:
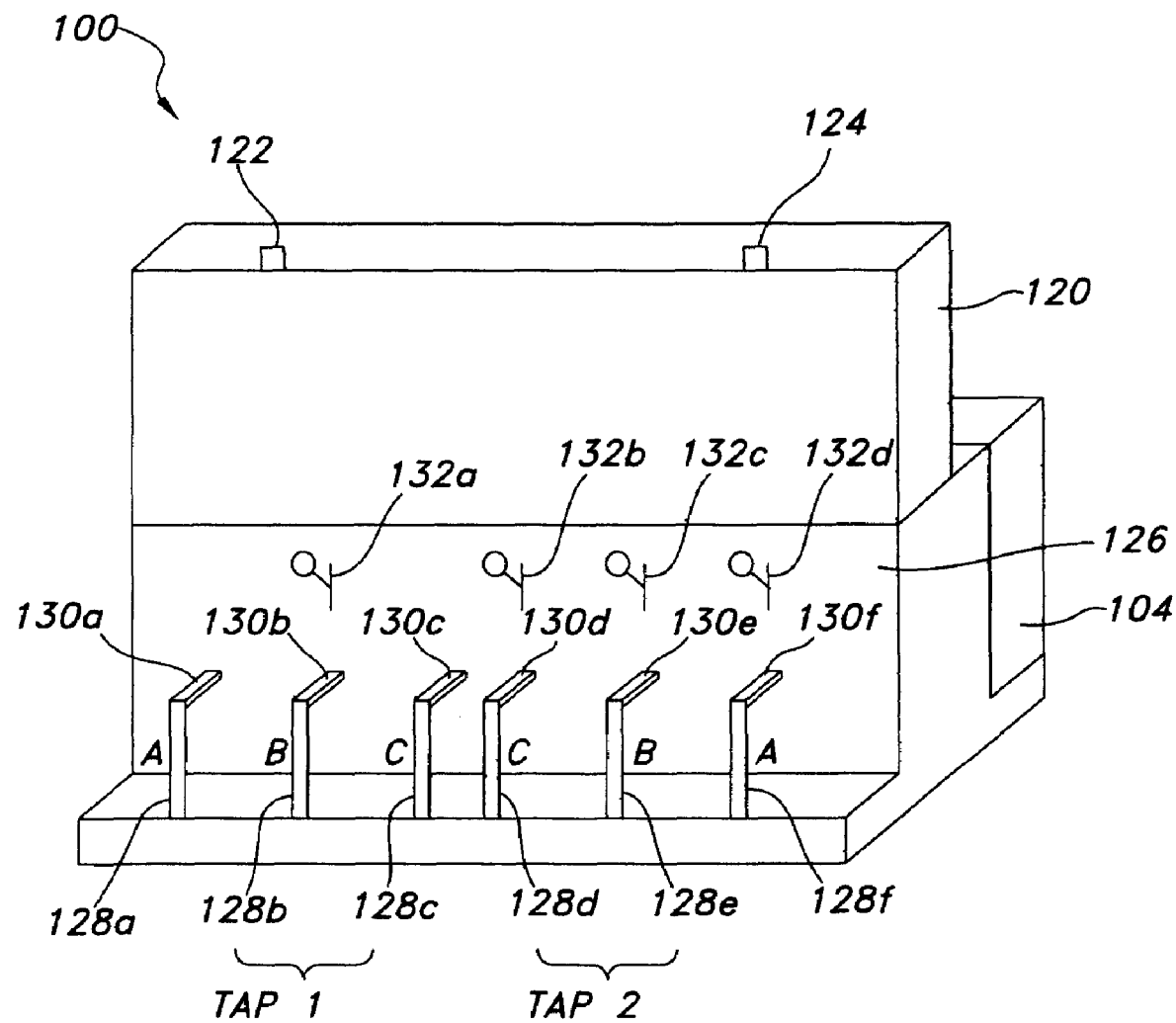
FIG. 2 illustrates another side of the switchgear including a tap side door that is positionable between an open position shown in FIG. 2 and a closed position shown in FIG. 1 in an exemplary embodiment.

As shown in FIG. 1, the switchgear 100 includes a protective enclosure 102 having, for example, a source side door 104 positionable between an open position (FIG. 1) and a closed position (FIG. 2). Latch elements 106 and/or 108 may be used to lock source side door 104 in a closed position. Inside the source side door 104 is a front plate 110 that forms a portion of the enclosure 102. Cables 112a-112f may be coupled to a lower end of the enclosure 102 and are connected to active switching elements (described below) in the enclosure 102, and each of the cables 112a-112f typically carry power in three phases from two different sources. For example, cables 112a-112c may carry, respectively, the A, B and C phases of power from source 1, and cables 112d-112f may carry, respectively, the C, B and A phases of power from source 2.

Cables 112a-112f may be coupled to the front-plate 110 and switchgear 100 through, for example, connector components 114a-114f that join the cables 112a-112f to respective switching elements (not shown in FIG. 1) in the enclosure 102. The switching elements may, in turn, be coupled to an internal bus bar system (not shown in FIG. 1) in the enclosure 102.

Handles or levers 116a and 116b are coupled to the enclosure 102 and may operate active switchgear elements (described below) inside the switchgear 100 to open or interrupt the flow of current through the switchgear 100 via the cables 112a-112f and electrically isolate power sources 1 and 2 from load-side or power receiving devices. The cables 112a-112c may be disconnected from the internal bus bar system by manipulating the handle 116a. Similarly, cables 112d-112f may be disconnected from the internal bus bar system by manipulating the handle 116b. Handles 116a and 116b are mounted onto the front-plate 110 as shown in FIG. 1. In an exemplary embodiment, the active switch elements on the source side of the switchgear 100 are vacuum switch assemblies (described below), and the vacuum switch assemblies may be used in combination with other types of fault interrupters and fuses in various embodiments of the invention.

One exemplary use of switchgear is to segregate a network of power distribution cables into sections such as, for example, by opening or closing the switch elements. The switch elements may be opened or closed, either locally or remotely, and the power supplied from one source to the switchgear may be prevented from being conducted to the other side of the switchgear and/or to the bus. For example, by opening the switch levers 116a and 116b, power from each of the sources 1 and 2 on one side of the switchgear is prevented from being conducted to the other side of the switchgear and to the bus and the taps. In this manner, a utility company is able to segregate a portion of the network for maintenance, either by choice, through the opening of switchgear, or automatically for safety, through the use of a fuse or fault interrupter, depending on the type of active switching elements included in the switchgear.

FIG. 2 illustrates another side of the switchgear 100 including a tap side door 120 that is positionable between open (shown in FIG. 2) and closed (FIG. 1) positions in an exemplary embodiment. Latch elements 122 and/or 124 may be used to lock the tap side door 120 in the closed position. Inside the tap door 120 is a front-plate 126 that defines a portion of the enclosure 102. Six cables 128a-128f may be connected to a lower side of the switchgear 100, and each of the respective cables 128a-128f typically carries, for example, one phase of power away from switchgear 100. For example, cable 128a may carry A phase power, cable 128b may carry B phase power and cable 128c may carry C phase power. Similarly, cable 128d may carry C phase power, cable 128e may carry B phase power and cable 128f may carry A phase power. Connectors 130a-130f connect cables 128a-128f to switchgear.

It should be noted that the exemplary switchgear 100 in FIGS. 1 and 2 shows one only one exemplary type of phase configuration, namely an ABC CBA configuration from left to right in FIG. 2 so that the corresponding cables 128a-128c and 128d-128f carry the respective phases ABC and CBA in the respective tap 1 and tap 2. It is understood, however, that other phase configurations may be provided in other embodiments, including but not limited AA BB CC so that cables 128a and 128b each carry A phases of current, cables 128c and 128d each carry B phases of current, and so that cables 128e and 128f each carry C phases of current. Still other configurations of switchgear may have one or more sources and taps on the same front-plate 110 (FIG. 1) or 126 (FIG. 2), or on the sides of the switchgear on one or more additional front plates. It also contemplated that each phase may be designated by a number, such as 1, 2 and 3, and that the switchgear may accommodate more or less than three phases of power. Thus, a switchgear may have, for example only, a configuration of 123456 654321 on the tap side of the switchgear 100.

A frame may be positioned internal to the switchgear and provide support for the active switching elements as well as the bus bar system, described below. In other words, the frame holds the active switching elements and bus bar system in place once they are coupled to the frame. The frame is oriented to allow portions of the active switching elements, typically bushings, to protrude as a bushing plane so that connections to the various cables can be made.

In an exemplary embodiment, a lever or handle 132a operates active switchgear elements, as described below, inside the switchgear 100 to disconnect cables 128a, 128b, 128c from the internal bus bar system. Similarly, handles 132b-132d cause one of individual cables 128d, 128e, 128f to disconnect and connect, respectively, from the internal bus bar system. In an exemplary embodiment, the active switchgear elements on the tap side of the switchgear 100 include vacuum interrupter assemblies (described below), and the vacuum interrupter assemblies may be used in combination with fuses and various types of fault interrupters in further and/or alternative embodiments of the invention.

Figure 3:
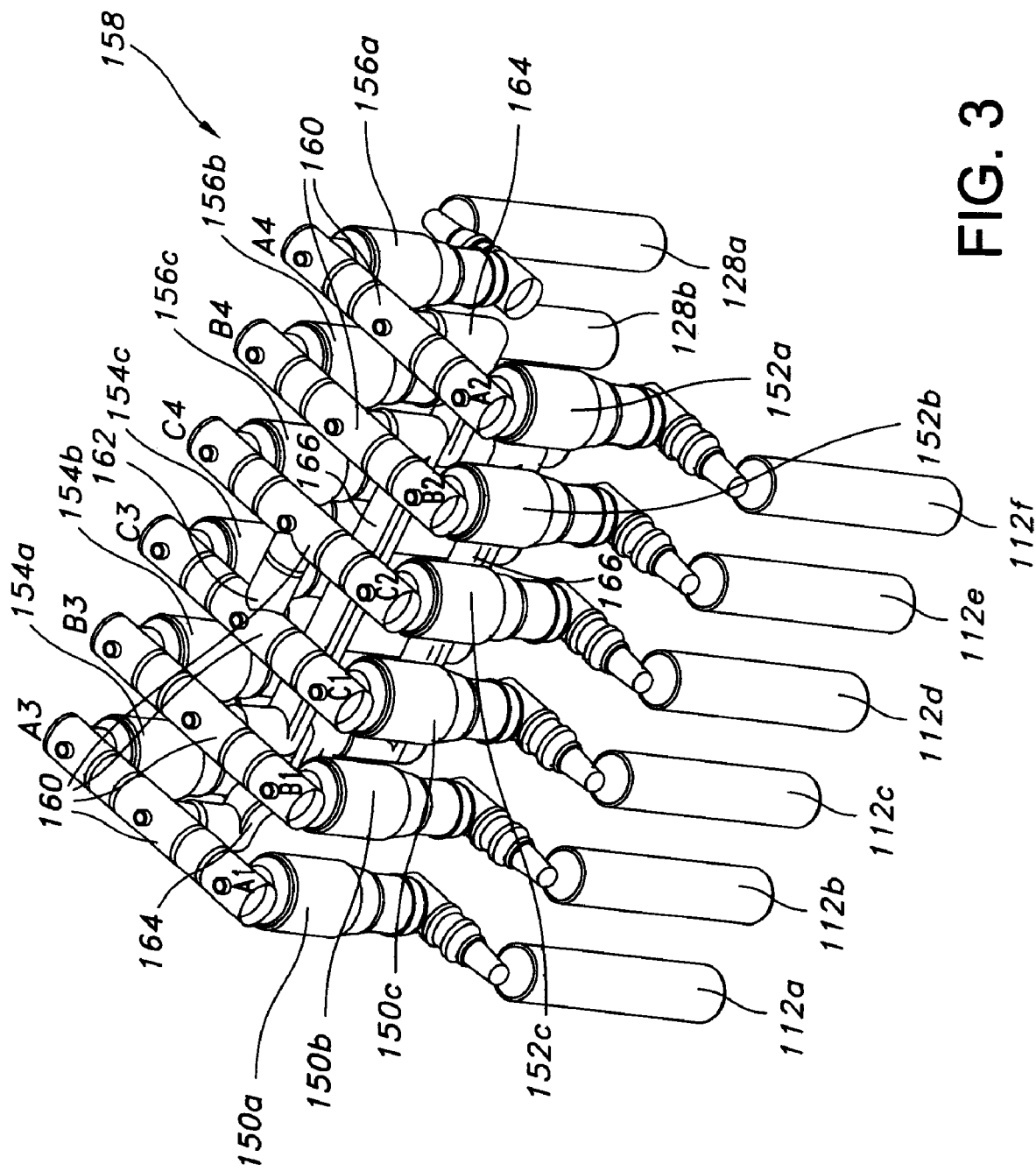
FIG. 3 is a perspective view of exemplary internal components of the switchgear removed from the enclosure shown in FIG. 1 and without the supporting frame, cables, or cable connectors for clarity.

FIG. 3 is a perspective view of exemplary internal components of the switchgear 100 illustrated removed from enclosure 102 and without the supporting frame, cables, or cable connectors for clarity. Switch element assemblies 150 and fault interrupter assemblies 152 may be positioned on opposites sides, for example, the source side and the tap side, respectively, of the switchgear assembly. Cable conduits 112a-112f may contain respective cables to be connected to respective switch element assemblies 150a-150c and 152c-152a, and cable conduits 128a-128f (cable conduits 128b - 128f not labeled in FIG. 3) may contain respective cables to be connected to the respective interrupter element assemblies 154a-154c and 156c-156a.

A bus bar system 158 may be situated in between and may interconnect the switch element or interrupter assemblies 150a-c, 152a-c, 154a-c and 156a-c via various modular and interchangeable molded solid dielectric connectors and bus components. The bus components include, but are not limited to, a male-tee 160, a female-tee 162, a bent bar zee connector 164, and a "U" connector 166. In different embodiments, the bus bar system 158 includes solid dielectric coated metal bar members formed in a modular bus and connector system. The modular bus system may be assembled with mechanical and push-on connections into various configurations, orientations of phase planes, and sizes of bus bar systems. In still another embodiment, molded solid dielectric bus bar members may be provided in modular form with push-on mechanical connectors to facilitate various configurations of bus bar systems with a reduced number of component parts.

In the exemplary embodiment, the switchgear is illustrated in a typical solid dielectric configuration, in that the bus work is compact with minimal clearance distances between different phase elements. Such close clearances are possible because of the dielectric properties of the molded solid dielectric covering of the bus components. Phase "C" switch element or interrupter assemblies 150c, 152c, 154c, and 156c are coupled together using a male-tee 160 and a female-tee 162. Phase "B" switch element or interrupter assemblies 150b, 152b, 154b, and 156b are coupled together using two male-tees 160 and a "U" connector 166. Phase "A" switch element or interrupter assemblies 150a, 152a, 154a, and 156a are coupled together using two male-tees 160, two bent bar zee connectors 164 and a "U" connector 166. Utilizing bent bar zee connectors 164 permits moving bus components such as "U" connector 166 from interfering with other bus components and maintaining a predetermined minimum clearance distance between the bus components, especially those having different voltages such as different phase components. Without the unique dimensional features of bent bar zee connectors 164, additional bus components would be needed to accomplish coupling of the incoming and outgoing cables. Such additional components would add to the complexity, cost, and maintenance of the installation.

Figure 4:
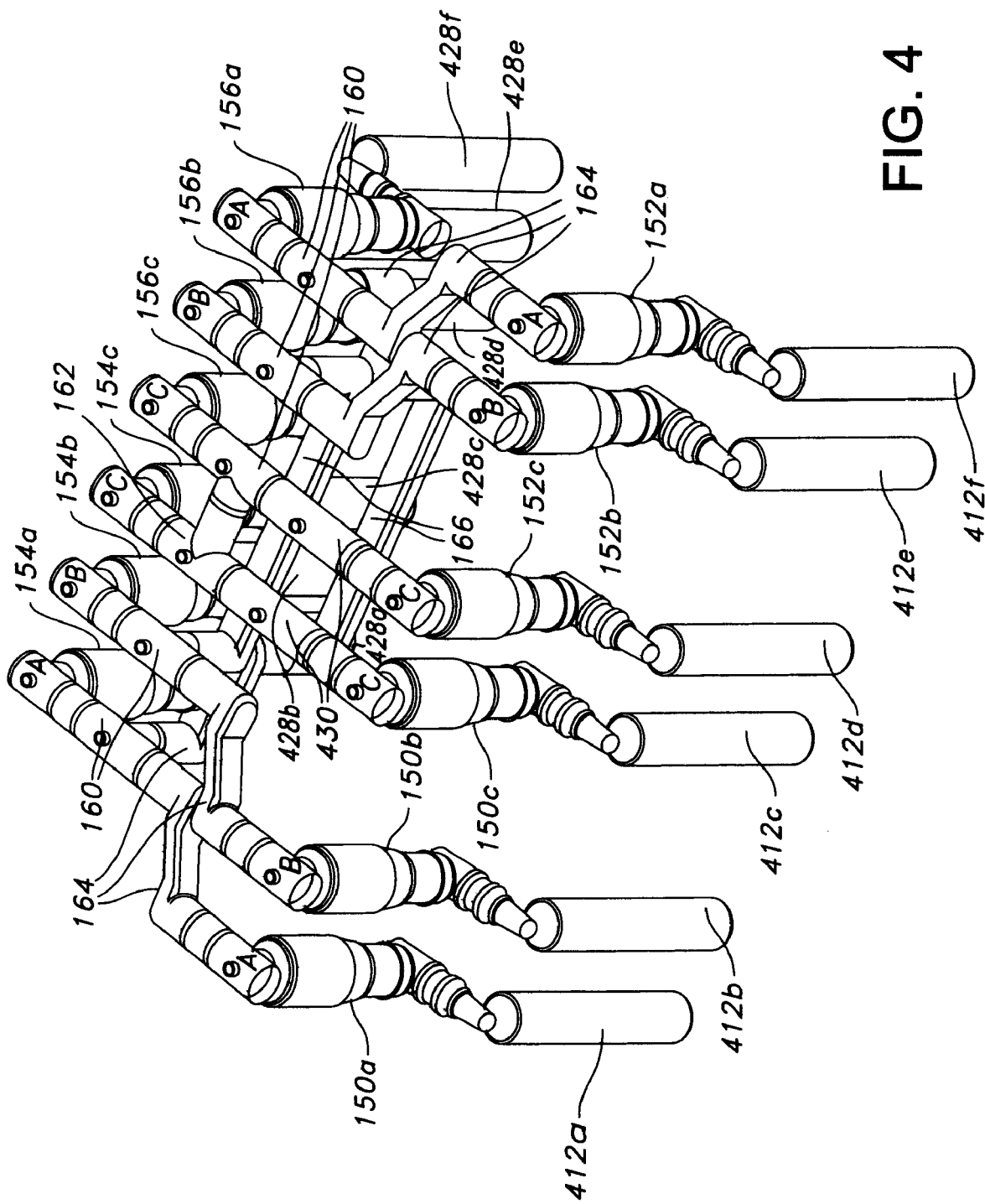
FIG. 4 is a perspective view of another configuration of exemplary internal components of the switchgear illustrated removed from enclosure and without the supporting frame, cables, or cable connectors for clarity.

FIG. 4 is a perspective view of another configuration of exemplary internal components of the switchgear 100 illustrated removed from enclosure 102 and without the supporting frame, cables, or cable connectors for clarity. Cable conduits 412a-412f may contain respective cables to be connected to respective switch element assemblies 150a-150c and 152c-152a, and cable conduits 428a-428f may contain respective cables to be connected to the respective interrupter element assemblies 154a-154c and 156c-156a.

In the exemplary embodiment, the switchgear is illustrated in a first retrofit configuration, in that the bus work being replaced may have required more clearance between bus components on the source side or the tap side. In such an instance, cable conduits 412a-412f may be spaced differently than cable conduits 428a-428f such that bus components are reconfigured to accommodate the different spacing. In known switchgear components such accommodation in a retrofit application is accomplished using custom sized bus work coupled together using fasteners. In the exemplary embodiment, Phase "C" switch element or interrupter assemblies 150c, 152c, 154c, and 156c are coupled together using a male-tee 160, a female-tee 162, and two bushing extenders 430. Phase "B" switch element or interrupter assemblies 150b, 152b, 154b, and 156b are coupled together using two male-tees 160, two bent bar zee connectors 164, and a "U" connector 166. Phase "A" switch element or interrupter assemblies 150a, 152a, 154a, and 156a are coupled together using two male-tees 160, four bent bar zee connectors 164 and a "U" connector 166. Utilizing bent bar zee connectors 164 permits extending the bus components reach laterally to permit connection of switch element or interrupter assemblies 156a to 152a, 156b to 152a, 154b to 150b, and 154a to 150a. Without using bent bar zee connectors 164, the bus components would require ninety degree components and various lengths of short jumpers to permit maintaining a clearance distance between different adjacent phases.

Figure 5:
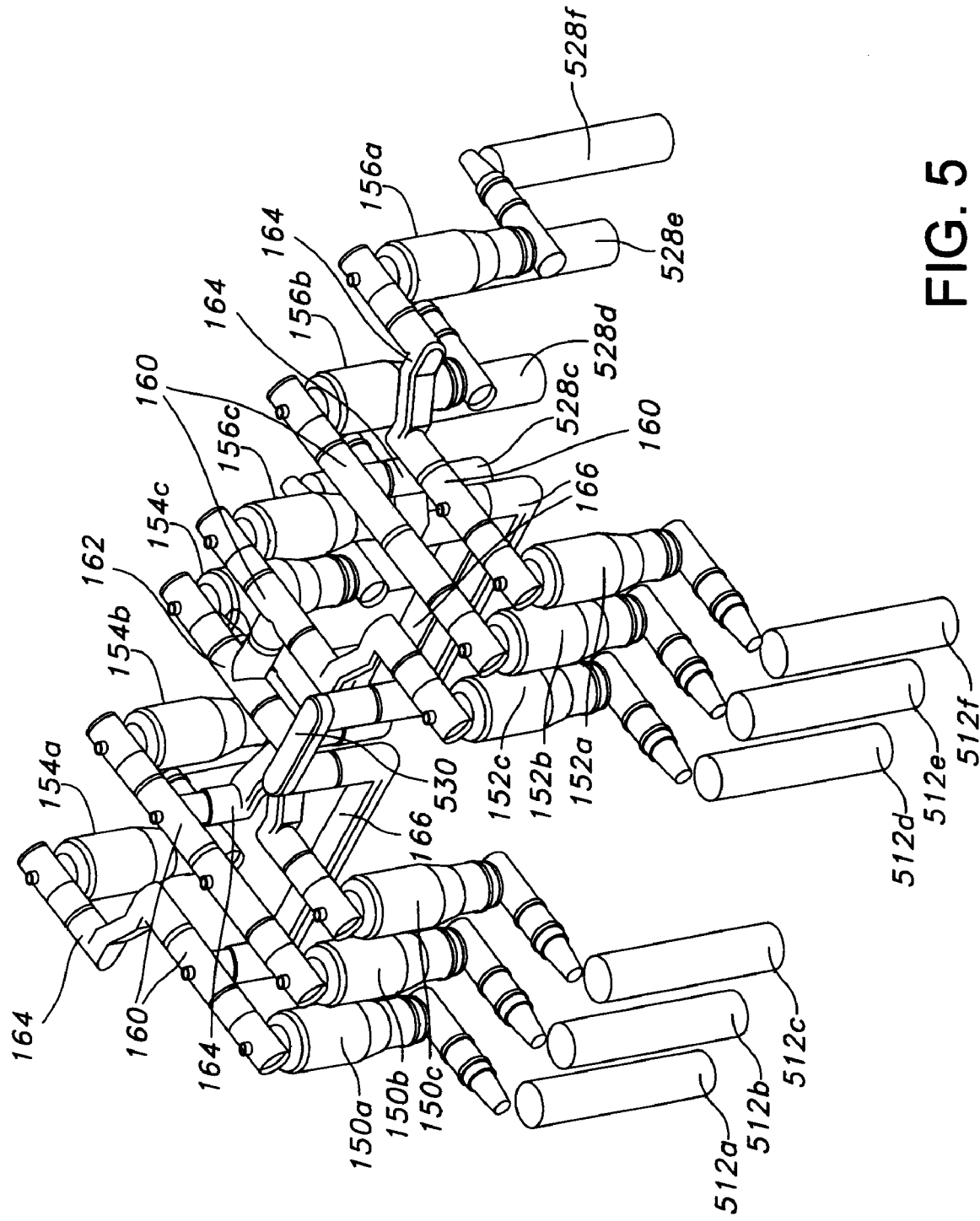
FIG. 5 is a perspective view of yet another configuration of exemplary internal components of the switchgear illustrated removed from enclosure and without the supporting frame, cables, or cable connectors for clarity.

FIG. 5 is a perspective view of yet another configuration of exemplary internal components of the switchgear 100 illustrated removed from enclosure 102 and without the supporting frame, cables, or cable connectors for clarity. Cable conduits 512a-512f may contain respective cables to be connected to respective switch element assemblies 150a-150c and 152c-152a, and cable conduits 528a-528f (cable conduits 528a and 528b not labeled in FIG. 5) may contain respective cables to be connected to the respective interrupter element assemblies 154a-154c and 156c-156a.

In the exemplary embodiment, the switchgear is illustrated in a second retrofit configuration, in that the bus work being replaced may have required more clearance on both the source side or the tap side than is possible with a solid dielectric bus system. In such an instance, cable conduits 412a-412f may be spaced differently than cable conduits 428a-428f such that bus components are reconfigured to accommodate the different spacing. In known switchgear components such accommodation in a retrofit application is accomplished using custom sized bus work coupled together using fasteners. However, using the modular molded solid dielectric bus components of various embodiments of the present invention, interchangeable bus components can be used to accommodate a plurality of different cable conduit configurations. In the exemplary embodiment, Phase "C" switch element or interrupter assemblies 150c, 152c, 154c, and 156c are coupled together using a male-tee 160, a female-tee 162, and two bent bar zee connectors 164. Phase "B" switch element or interrupter assemblies 150b, 152b, 154b, and 156b are coupled together using two male-tees 160, two bushing extenders 430, two bent bar zee connectors 164, and a "U" connector 166. Phase "A" switch element or interrupter assemblies 150a, 152a, 154a, and 156a are coupled together using two male-tees 160, two bent bar zee connectors 164 and two "U" connectors 166 and a short-U connector 530. Bent bar zee connectors 164 permits maintaining a clearance distance between different adjacent phases without requiring ninety degree components and various lengths of short jumpers to permit while coupling bus components with different lateral spacing requirements.

Figure 6:
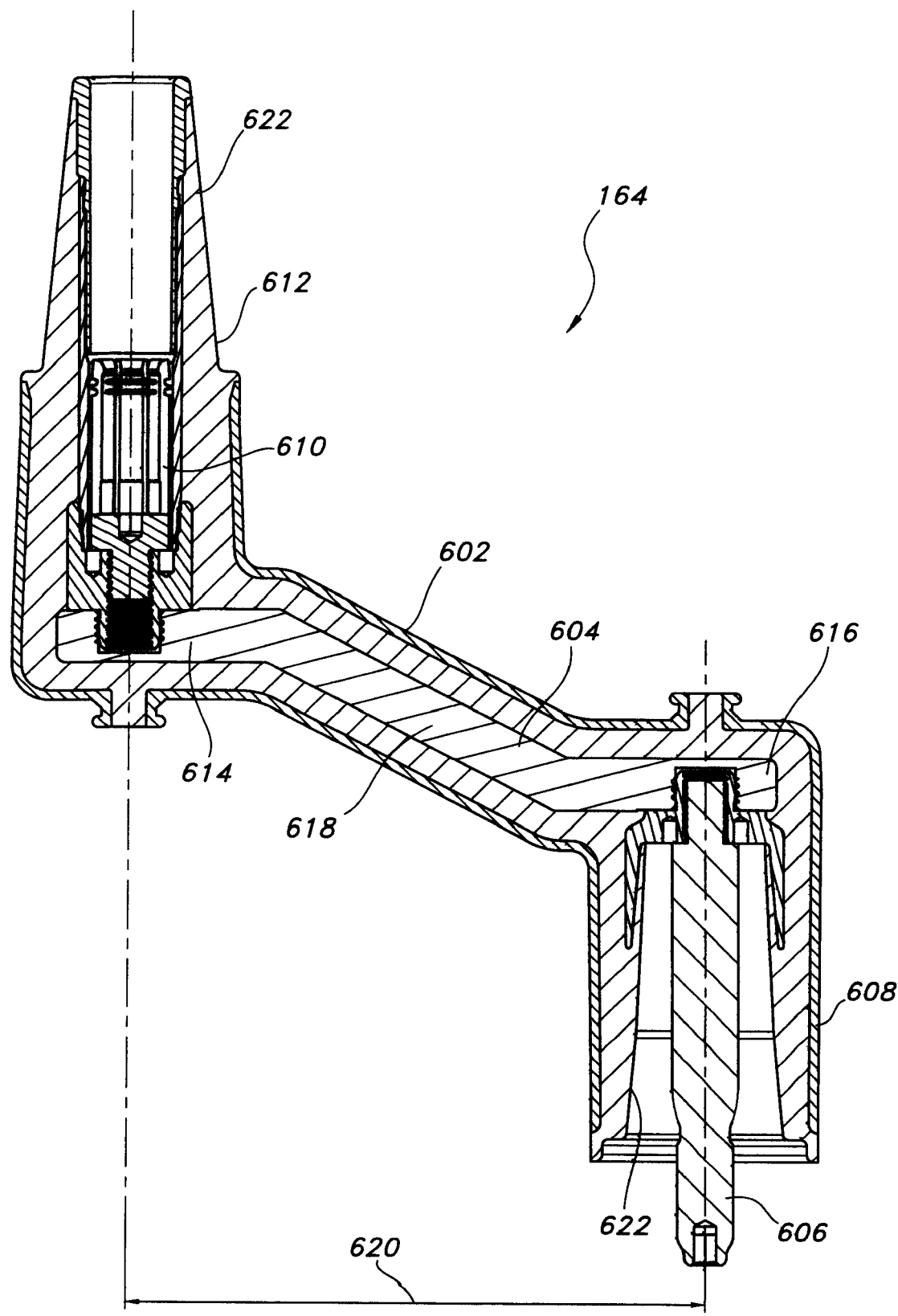
FIG. 6 is a sectional view of bent bar zee connector that may be used with switchgear shown in FIGS. 3, 4, and 5.

FIG. 6 is a sectional view of bent bar zee connector 164 that may be used with switchgear 100 (shown in FIGS. 3, 4, and 5). In the exemplary embodiment, bent bar zee connector 164 is formed of an insulated connector housing 602. A bent bus bar 604 interconnects a contact probe 606 in a female housing end 608 and a contact assembly 610 in a male housing end 612. Bent bus bar 604 comprises a contact probe portion 614 and a contact assembly portion 616 offset with respect to each other in substantially parallel alignment by a bus bar 618 extending therebetween and forming an oblique angle with contact probe portion 614 and contact assembly portion 616. Contact probe 606 and contact assembly 610 extend away from contact probe portion 614 and a contact assembly portion 616, respectively in opposite directions. Contact probe 606 and contact assembly 610 are spaced apart a distance 620. Contact probe 606 and contact assembly 610 are formed as complementary electrical connecting contacts that are configured to mate to bus components having similarly matching mating components. Accordingly, contact probe 606 is configured to mate to a contact assembly 610 of another bus component and contact assembly 610 is configured to mate to a contact probe 606 of another bus component. As such various configurations of bus components may be assembled into systems capable of joining a plurality of configurations of preexisting switchgear cable connectors.

EPDM rubber insulation, for example, may surround bent bus bar 604, contact probe 606, and contact assembly 610, and may define the interfaces 622 between female housing end 608 and male housing end 612.

While assembly 164 is formed into a Z-shaped configuration having substantially equal legs in the exemplary embodiment, it is appreciated that connector assembly 164 may be alternatively shaped in other configurations while still providing the modular interconnecting functionality of embodiments of the present invention. For example, female housing end 608 and male housing end 612 may be unequal in size, shape and dimension such as length, and female housing end 608 and male housing end 612 need not extend from contact probe portion 614 and contact assembly portion 616 at right angles in other embodiments.

Notably, and unlike known connectors, connector assembly 164 includes a bent bus bar that permits interconnection of other bus components in various configurations for connecting cable connectors that are fixed in a plurality of different configurations by existing conduit or encasement in concrete or the ground.

In the exemplary embodiment connector assembly 164 is used with a 600 A, 21.1 kV class loadbreak connector for use with medium voltage switchgear or other electrical apparatus in a power distribution network of above 600V. It is appreciated, however, that the connector concepts described herein could be used in other types of connectors and in other types of distribution systems, such as high voltage systems, as desired.

Figure 7:
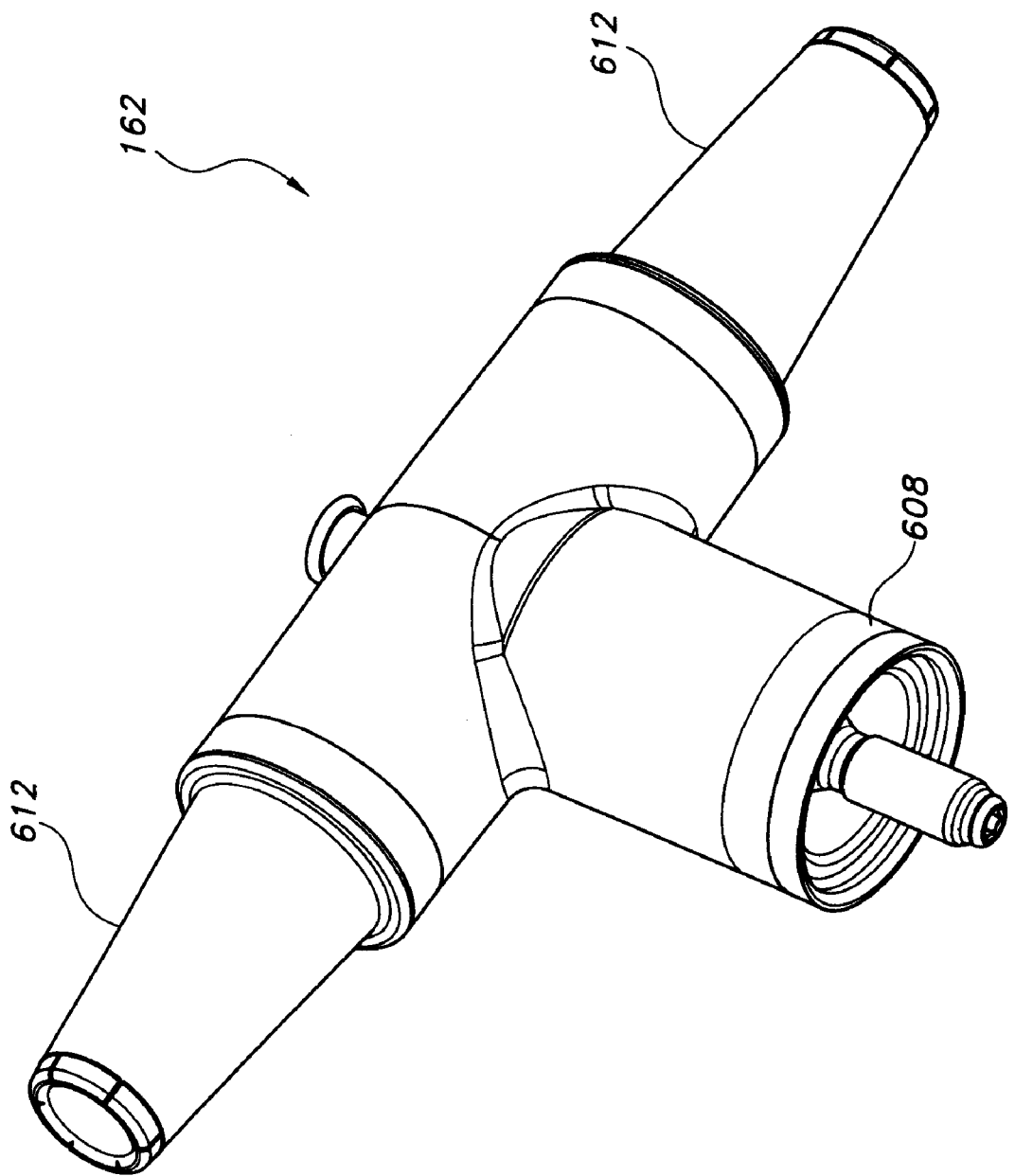
FIG. 7 is a perspective view of an exemplary embodiment of a female-tee that may be used with switchgear shown in FIGS. 3, 4, and 5.

FIG. 7 is a perspective view of an exemplary embodiment of a female-tee 162 that may be used with switchgear 100 (shown in FIGS. 3, 4, and 5). In the exemplary embodiment, female-tee 162 includes a female housing end 608 and a male housing end 612 extending away from each other at substantially right angles. Female housing end 608 and male housing end 612 are complementary to similar female housing ends 608 and male housing ends 612 of other switchgear 100 bus components.

Figure 8:
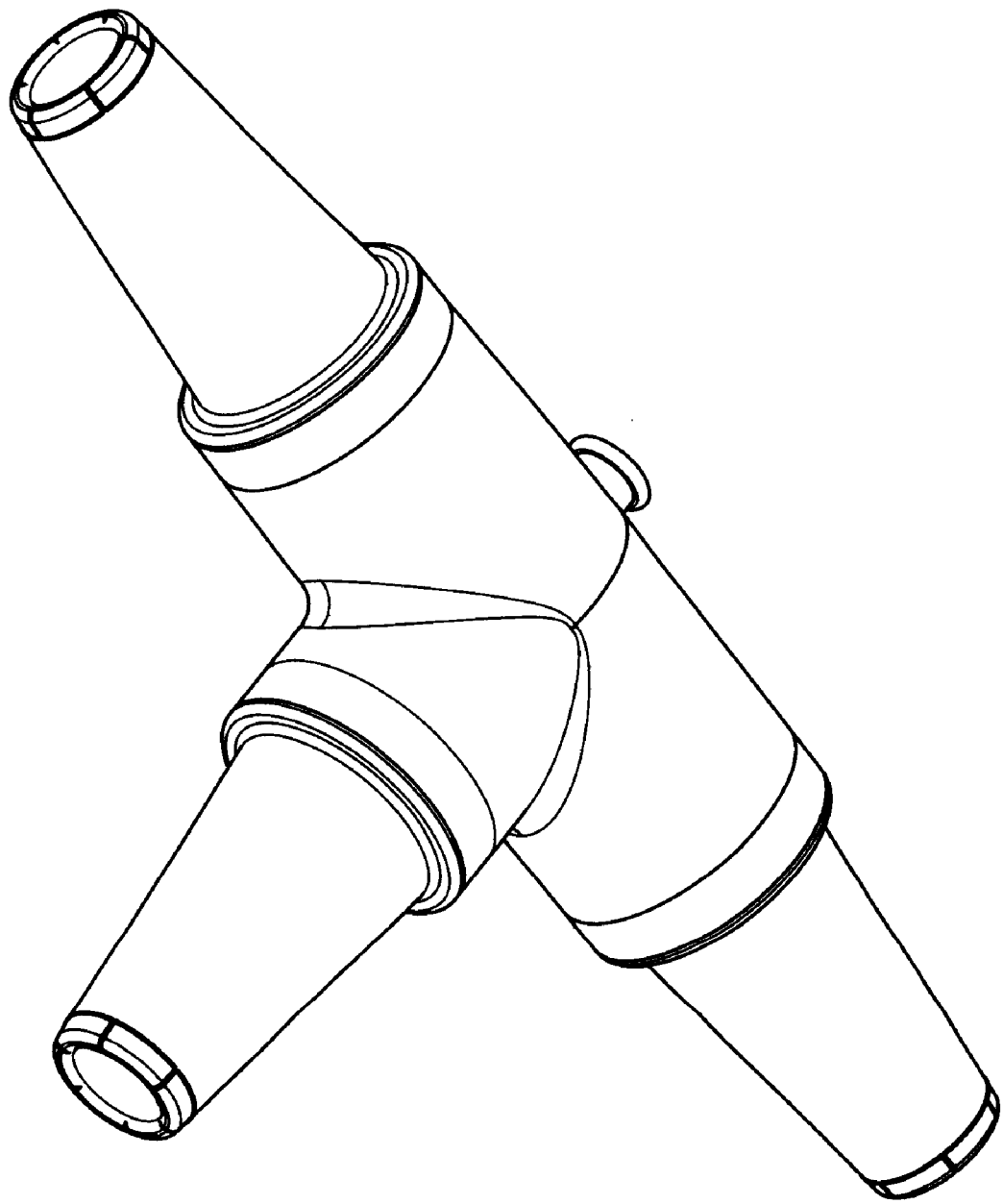
FIG. 8 is a perspective view of an exemplary embodiment of a male-tee that may be used with the switchgear shown in FIGS. 3, 4, and 5.

FIG. 8 is a perspective view of an exemplary embodiment of a male-tee 160 that may be used with switchgear 100 (shown in FIGS. 3, 4, and 5). In the exemplary embodiment, male-tee 160 includes three male housing ends 612 extending away from each other at substantially right angles. Male housing ends 612 are complementary to female housing ends 608 of other switchgear 100 bus components.

Figure 9:
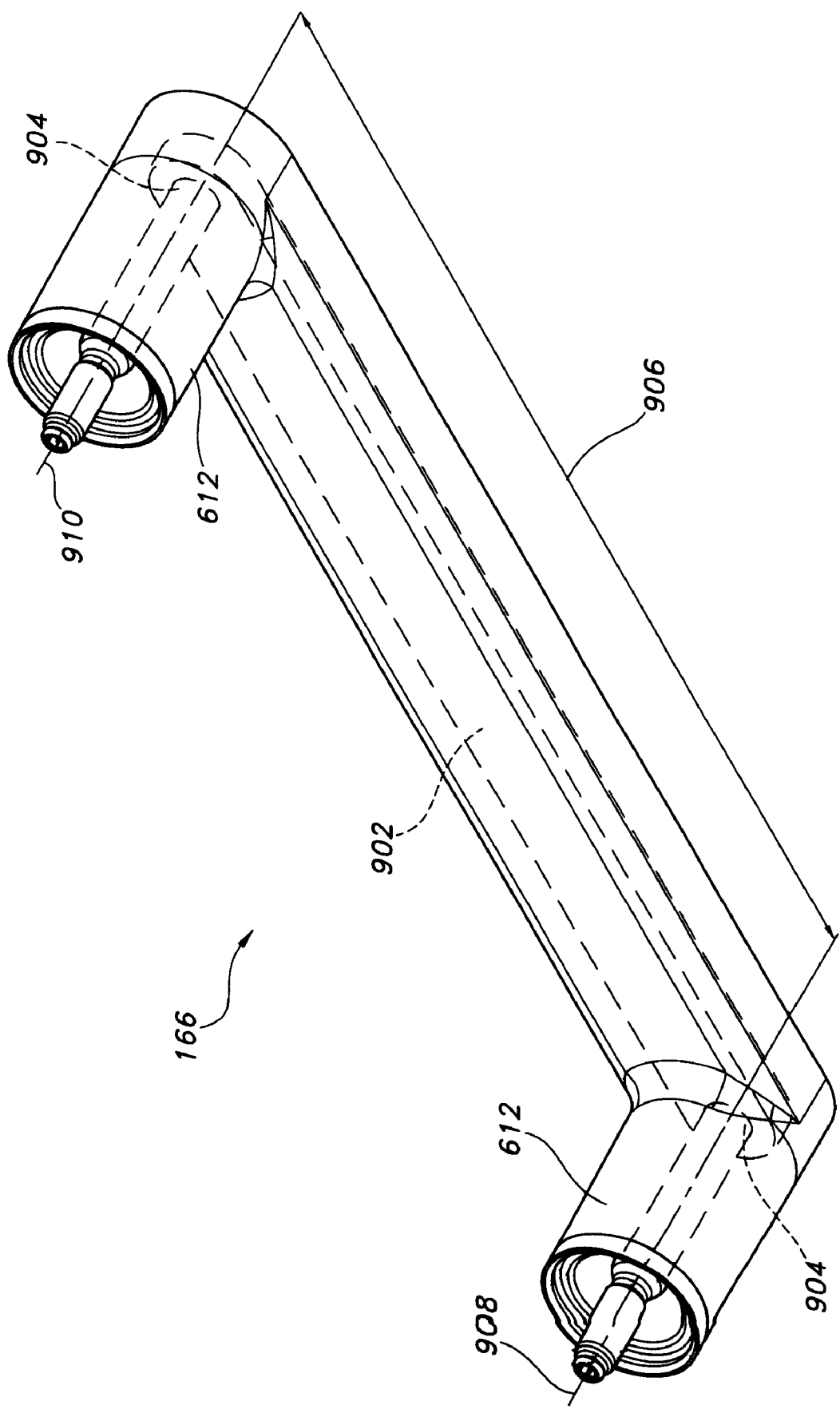
FIG. 9 is a perspective view of an exemplary embodiment of a "U" connector that may be used with the switchgear shown in FIGS. 3, 4, and 5.

FIG. 9 is a perspective view of an exemplary embodiment of a "U" connector 166 that may be used with switchgear 100 (shown in FIGS. 3, 4, and 5). In the exemplary embodiment, "U" connector 166 includes two male housing ends 612 and a bus bar 902 extending between a coupling end 904 of each male housing end 612. Typically, male housing ends 612 extend away from bus bar 902 in substantially the same direction, however male housing ends 612 may extend in other directions and at different angles in other embodiments of the present invention. Male housing ends 612 are spaced a distance 906 apart from a centerline 908 to a centerline 910. Distance 906 is selected based on standard spacing considerations for new installations and retrofit applications. In the exemplary embodiment, distance 906 is approximately twenty-four inches. Male housing ends 612 are complementary to female housing ends of other switchgear bus components.

Figure 10:
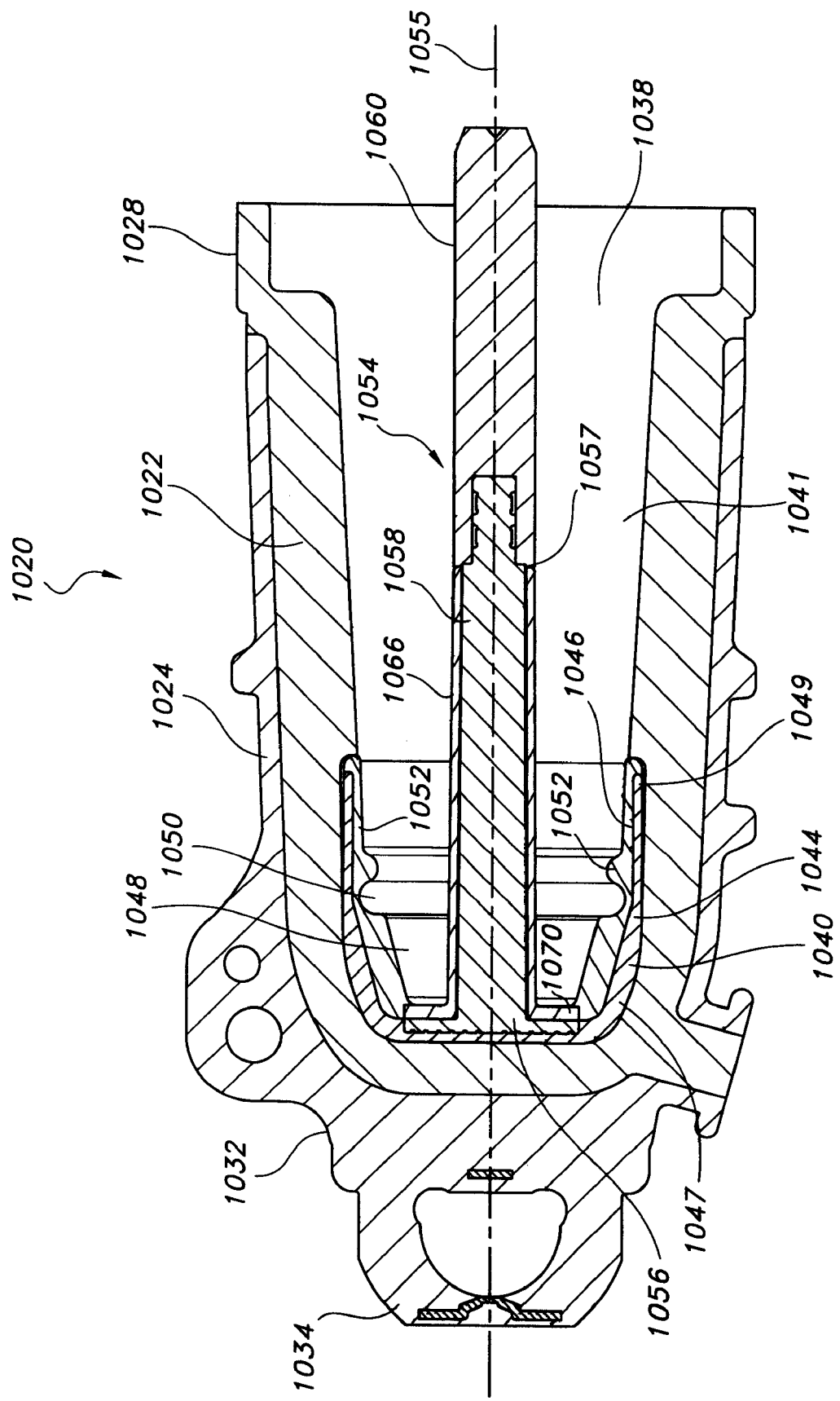
FIG. 10 is a longitudinal cross-sectional view of a conventional a female connector, such as an elbow connector, electrically connected to a portion of a high-voltage circuit.

FIG. 10 is a longitudinal cross-sectional view of a conventional a female connector 1020, such as an elbow connector, electrically connected to a portion of a high-voltage circuit (not shown). Female connector 1020 may form a portion of a separable loadbreak connector system (male portion not shown) that may be utilized to connect and disconnect cables to switchgear 100 under energized circuit conditions at rated voltage and under electrical load current conditions. As shown, female contact connector 1020 is in the form of a cable termination device, such as an elbow. Male and female contact connectors are reversibly connectable and respectively interfit to achieve electrical connection. In the preferred embodiment described herein, the connector assembly is a 200 A, 250 KV class connector assembly.

Female connector 1020 includes an elastomeric and electrically-resistive housing 1022 of a material such as EPDM (ethylene-propylene-dienemonomer) rubber which is provided on its outer surface with a semiconductive shield layer 1024 that may be grounded by means of a perforated grounding tab (not shown). Female connector 1020 is generally elbow-shaped, being formed of an upper horizontal portion 1028 and a lower vertical portion (not shown) connected at a central portion 1032. A pulling eye 1034 extends horizontally from the central portion 1032. Horizontally-oriented and generally conical bore 1038 is disposed within the housing 1022. A semiconductive insert 1040 such as a faraday cage is contained within the housing 1022. Semiconductive insert 1040 is configured to maintain an electric potential substantially equal to the electric potential of contact probe 1054. Faraday cage 1040 facilitates reducing corona discharges within an interface 1041 when connector 1020 is mated, for example, to the male mating connector. A horizontally-disposed portion 1044 of the insert 1040 extends into the upper portion 1028 of the connector 1020 and presents an inner radial surface 1046 which defines a conically-shaped recess 1048. Insert 1040 also presents an annular locking ring 1050 which is inwardly directed within the recess 1048 from the inner radial surface 1046 of the insert 1040. The locking ring 1050 divides the inner radial surface 1046 into a recessed area 1047 and an extended area 1049.

An insulative layer 1052 of electrically-resistive material is disposed within the recess 1048 of the insert 1040. The insulative layer 1052 is preferably also made of EPDM and may be unitarily molded with portions of the housing 1022 during manufacture. The insulative layer 1052 preferably extends from the inner surface of the bore 1038 along the inner surface 1046 of the insert 1040 to at least the locking ring 1050 so that the extended area 1049 of the inner surface 1046 is insulated. Additionally, the recessed area 1047 of the insert 1040 may be insulated.

A probe assembly 1054 is largely contained within housing 1022 and aligned down the axis 1055 of the conical bore 1038 of insert 40. The probe assembly 1054 threadably engages a conductor contact 1056. The probe assembly 1054 includes a contact element or probe 1058 that is formed of a material such as copper and extends horizontally from the conductor contact 1056 into the bore 1038 of the upper portion 1028 and the recess 1048 of the insert 1040. At a distal end 1057 of the probe 1058 extends an arc follower 1060 of ablative material. A preferred ablative material for the arc follower 1060 is acetal co-polymer resin loaded with finely divided melamine. The ablative material is typically injection molded onto a reinforcing pin.

An insulative sheath 1066 is disposed about the portions of the exterior of the probe 1058. The sheath 1066 does not cover the entire length of the probe 1058 as at least the distal end 1057 of the probe 1058 proximate to the arc follower 1060 will need to be remain unsheathed so that an electrical connection may be made. It is preferred, however, that the sheath 1066 should at least extend to and abut the recessed area 1047 of the inner radial surface 1046 of insert 1040. Insulative sheath 1066 and insulative layer 1052 facilitate providing greater distance from the energized arc follower 1060 to ground potential at an opening end of interface 1041 when connector 1020 is being removed from the male mating connector. Insulative layer 1052 is formed to an inner surface of insert 1040. During the process of assembling connector 1020, insulative sheath 1066 and insulative layer 1052 are formed separately and insulative layer 1052 is expected to bond securely to insulative sheath 1066 at an abutting joint 1070. However, if joint 1070 is not abutted and securely bonded, a gap between insulative sheath 1066 and insulative layer 1052 permits shorting the flashover distance between the energized contact extension 1060 and ground potential at an opening end of interface 1041.

Female connector 1020 may be configured as an elbow connector that engages the male mating connector via interface 1041 on one end, and engages, for example, a fuse element module on another end (not shown in FIG. 10. Alternatively, connector 1020 may be configured into another type of connector having any shape or configuration desired. Connector 1020 may also be configured as a protective cap for use with the male mating connector that is energized at rated voltage as described above.

Figure 11:
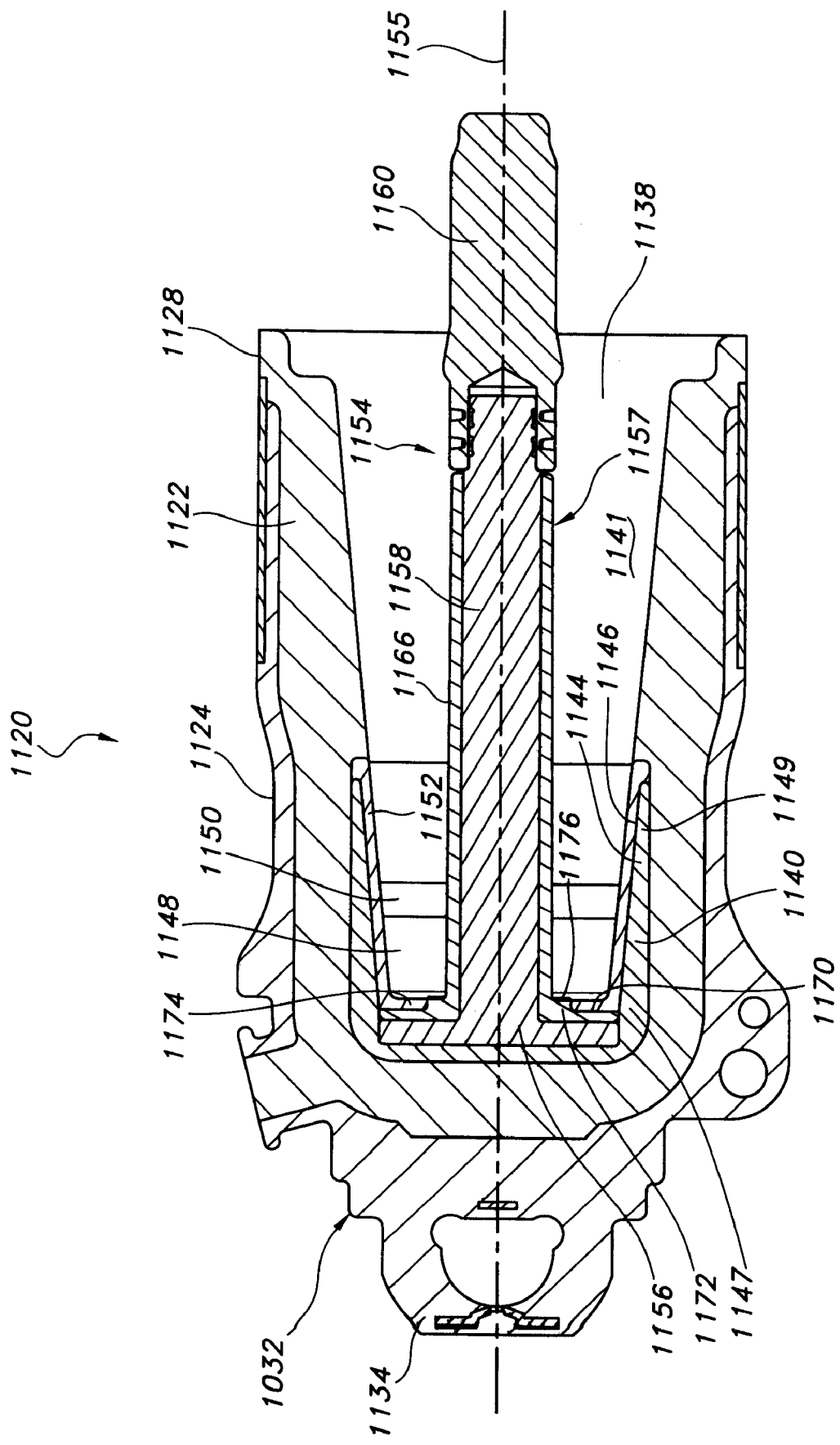
FIG. 11 is a longitudinal cross-sectional view of a female connector portion of a separable loadbreak connector system in accordance with an embodiment of the present invention.

FIG. 11 is a longitudinal cross-sectional view of a female connector 1100 portion of a separable loadbreak connector system (male portion not shown) in accordance with an embodiment of the present invention. Female connector 1120 includes an elastomeric and electrically-resistive housing 1122 of a material such as EPDM (ethylene-propylene-dienemonomer) rubber which is provided on its outer surface with a semiconductive shield layer 1124 that may be grounded by means of a perforated grounding tab (not shown). Female connector 1120 is generally elbow-shaped, being formed of an upper horizontal portion 1128 and a lower vertical portion (not shown) connected at a central portion 1132. A pulling eye 1134 extends horizontally from the central portion 1132. Horizontally-oriented and generally conical bore 1138 is disposed within the housing 1122. A semiconductive insert 1140 such as a faraday cage is contained within the housing 1122. Semiconductive insert 1140 is configured to maintain an electric potential substantially equal to the electric potential of contact probe 1154. Faraday cage 1140 facilitates reducing corona discharges within an interface 1141 when connector 1120 is mated, for example, to the male mating connector. A horizontally-disposed portion 1144 of the insert 1140 extends into the upper portion 1128 of the connector 1120 and presents an inner radial surface 1146 which defines a conically-shaped recess 1148. Insert 1140 also presents an annular locking ring 1150 which is inwardly directed within the recess 1148 from the inner radial surface 1146 of the insert 1140. The locking ring 1150 divides the inner radial surface 1146 into a recessed area 1147 and an extended area 1149.

An insulative layer 1152 of electrically-resistive material is disposed within the recess 1148 of the insert 1140. The insulative layer 1152 is preferably also made of EPDM and may be unitarily molded with portions of the housing 1122 during manufacture. The insulative layer 1152 preferably extends from the inner surface of the bore 1138 along the inner surface 1146 of the insert 1140 to at least the locking ring 1150 so that the extended area 1149 of the inner surface 1146 is insulated. Additionally, the recessed area 1147 of the insert 1140 may be insulated.

A probe assembly 1154 is largely contained within housing 1122 and aligned down the axis 1155 of the conical bore 1138 of insert 40. The probe assembly 1154 threadably engages a conductor contact 1156. The probe assembly 1154 includes a contact element or probe 1158 that is formed of a material such as copper and extends horizontally from the conductor contact 1156 into the bore 1138 of the upper portion 1128 and the recess 1148 of the insert 1140. At a distal end 1157 of the probe 1158 extends an arc follower 1160 of ablative material. A preferred ablative material for the arc follower 1160 is acetal co-polymer resin loaded with finely divided melamine. The ablative material is typically injection molded onto a reinforcing pin.

An insulative sheath 1166 is disposed about the portions of the exterior of the probe 1158. The sheath 1166 does not cover the entire length of the probe 1158 as at least the distal end 1157 of the probe 1158 proximate to the arc follower 1160 will need to be remain unsheathed so that an electrical connection may be made. It is preferred, however, that the sheath 1166 should at least extend to the recessed area 1147 of the inner radial surface 1146 of insert 1140. Insulative sheath 1166 and insulative layer 1152 facilitate providing greater distance from the energized arc follower 1160 to ground potential at an opening end of interface 1141 when connector 1120 is being removed from the male mating connector. Insulative layer 1152 is formed to an inner surface of insert 1140. During the process of assembling connector 1120, insulative sheath 1166 and insulative layer 1152 are formed separately and insulative layer 1152 is expected to bond securely to insulative sheath 1166 at an overlapping joint 1170. In the exemplary embodiment, insulative sheath 1166 extends along probe 1158 into recessed area 1147 and forms a radially outwardly extending annular flange 1172 at the base of probe 1158. Flange 1172 extends towards an inner surface of insert 1140 and in a preferred embodiment extends into contact with horizontally-disposed portion 1144 of the insert 1140. Insulative layer 1152 extends axially along horizontally-disposed portion 1144 of the insert 1140 and forms a radially inwardly extending flange 1174 that overrides radially outwardly extending annular flange 1172 of sheath 1166. In the present configuration sheath 1166 and insulative layer 1152 do not meet at an abutting joint but rather are bonded together at an overlapping joint 1170. In the exemplary embodiment, overlapping joint is configured to provide additional bonding surface between radially outwardly extending annular flange 1172 and radially inwardly extending flange 1174 than would be afforded by an abutting joint between flange 1172 and flange 1174.

Female connector 1120 may be configured to perform the functions described above with the connecting pieces described above with respect to the various figures illustrated the various embodiments of the present invention.

In first exemplary embodiment a bus connector includes a solid bus bar including at least one oblique bend, a first electrical connector coupled to a first end of the bus bar, and a second electrical connector coupled to a second end of the bus bar. Optionally, the first electrical connector and/or the second electrical connector extend perpendicularly away from the bus bar. The bus connector may further include a layer of solid insulation of rubber and/or plastic at least partially surrounding the bus bar and the first and/or second connectors. The bus connector may further include a semiconductive shield layer covering at least a portion of the insulation layer.

An insulation layer may surround the bus bar and the first and second connectors wherein the connector further includes a semiconductive shield layer covering at least a portion of the insulation layer. Optionally, the first electrical connector or the second electrical connector includes a contact probe and the other of the first electrical connector or the second electrical connector includes a plurality of contact fingers configured to receive a contact probe from a mating connector. Optionally, the bus bar includes a first oblique bend proximate the first end of the bus bar and a second oblique bend formed proximate to the second end of the bus bar. The first oblique bend and the second oblique bend may be formed in opposite directions and substantially equal magnitudes such that the first end and the second end are substantially parallel proximate to the second end of the bus bar. In another optional embodiment, the first and second connectors extend from a respective end of the bus bar in opposite directions such that a longitudinal axis of each of the first and second connectors are substantially parallel with respect to each other. Also optionally, at least one of the first electrical connector and the second electrical connector may extend perpendicularly away from the bus bar.

In a further optional embodiment, the bus connector may include a first connector member that includes an electrically-resistive housing having a generally conically-shaped interior bore, a semiconductive insert disposed within a portion of the bore, the insert presenting an inner radial surface which defines a generally conically-shaped recess, an elongated probe disposed within the housing, the probe assembly having a sheath of insulative material over at least a portion of its length and extending in a radially outward direction from a base of the probe, and an electrically-resistive insulative layer disposed extending from the conically-shaped interior bore along portions of the inner radial surface of the semiconductive insert and extending radially inwardly in overlapping engagement with a portion of the sheath.

In another embodiment, an electrical connector includes a first connector member that includes an electrically-resistive housing having a generally conically-shaped interior bore and a semiconductive insert disposed within a portion of the bore wherein the insert presents an inner radial surface which defines a generally conically-shaped recess. The electrical connector also includes an elongated probe assembly disposed within the housing having a sheath of insulative material over at least a portion of its length and extending in a radially outward direction from a base of the probe assembly. The electrical connector also includes an electrically-resistive insulative layer disposed extending from the conically-shaped interior bore along portions of the inner radial surface of the semiconductive insert and extending radially inwardly in overlapping engagement with the radially outwardly extending portion of the sheath.

Optionally, the connector includes a solid bus bar including at least one oblique bend wherein the bus bar is electrically coupled to the first connector member such that the first connector member extends from the bus bar substantially perpendicularly and the second connector member is electrically coupled to an opposite end of the bus bar. The bus bar may be electrically coupled to the second connector member such that the second connector member extends from the bus bar substantially perpendicularly.

In another embodiment, a bus bar connector kit includes a plurality of interchangeable connector assemblies wherein each connector assembly includes a solid bar substantially covered by a solid substantially homogenous insulation material. The insulation material is at least partially surrounded by a substantially homogeneous semiconductive material and each of the plurality of interchangeable connector assemblies includes at least one first connector member configured to mate with a complementary second connector member of another of the plurality of interchangeable connector assemblies.

Optionally, the bus bar connector kit includes an electrically-resistive housing having a generally conically-shaped interior bore and a semiconductive insert disposed within a portion of the bore, the insert presenting an inner radial surface which defines a generally conically-shaped recess. The housing also optionally includes an elongated probe disposed within the housing that has a sheath of insulative material over at least a portion of its length and extending in a radially outward direction from a base of the probe. The housing also optionally includes an electrically-resistive insulative layer disposed extending from the conically-shaped interior bore along portions of the inner radial surface of the semiconductive insert and extending radially inwardly in overlapping engagement with a portion of the sheath.

Optionally, the bus bar connector kit includes a Z-shaped connector assembly including a solid bus bar having at least one oblique bend, a first electrical connector coupled to a first end of the bus bar, and a second electrical connector coupled to a second end of the bus bar. The bus bar connector kit may also include a U-shaped connector assembly including a solid straight bus bar, a first electrical connector coupled to a first end of the bus bar, and a second electrical connector coupled to a second end of the bus bar wherein the first connector extends from the bus bar in a substantially perpendicular direction and the second connector extends from the bus bar in the substantially perpendicular direction.

The bus bar connector kit may also include a T-shaped connector assembly including at least one first connector member and at least one second connector member wherein like connector members are oriented in opposite directions and the other connector member is oriented approximately 90 degrees with respect to the like connector members. A The bus bar connector kit may also include a T-shaped connector assembly including three of at least one of a first connector member and a second connector member wherein two connector members are oriented in opposite directions and the third connector member is oriented approximately 90 degrees with respect to the like connector members.

In another embodiment a method for reducing the risk of flashover between electrical connectors during disconnection of a first and a second connectors includes insulating a conductive portion of the first connector using an insulating sheath, insulating a semiconductive portion of the first connector using an insulative layer, and joining the insulating sheath and the insulative layer in an overlapping bonded connection. Optionally, the first connector includes a connecting probe and the step of insulating the conductive portion includes insulating the connecting probe using an insulating sheath. The first connector may include a semiconductive insert and insulating a semiconductive portion of the first connector may include insulating the semiconductive insert using an insulative layer. The first connector may also include a connecting probe and joining the insulating sheath and the insulative layer includes joining the insulating sheath and the insulative layer at overlapping ends of the insulating sheath and the insulative layer proximate a base of the connecting probe.

While the invention has been described in terms of various specific embodiments, those skilled in the art will recognize that the invention can be practiced with modification within the spirit and scope of the claims.

What is claimed is:

1. A bus connector for a switchgear, comprising:
   a solid bus bar comprising
      a first end segment,
      a second end segment that is substantially parallel to the first end segment,
      a middle segment extending between the first end segment and the second end segment,
      a first side comprising a first oblique bend that is disposed proximate the first end segment, the first oblique bend defining a first obtuse angle that extends between an axis of the first end segment and an axis of the middle segment, and
      a second side disposed opposite the first side, the second side comprising a second oblique bend that is disposed proximate the second end segment, the second oblique bend defining a second obtuse angle that extends between an axis of the second end segment and an axis of the middle segment, the first and second oblique bends being formed in opposite directions, with substantially equal magnitudes;
a first electrical connector coupled to the first end segment of the bus bar, a mating end of the first electrical connector extending from the second side of the bus bar; and
a second electrical connector coupled to the second end segment of the bus bar, a mating end of the second electrical connector extending from the first side of the bus bar.

2. The bus connector of claim 1, wherein at least one of the first electrical connector and the second electrical connector extends perpendicularly away from the bus bar.

3. The bus connector of claim 1, further comprising:
an insulation layer surrounding the bus bar and the first and second electrical connectors; and
a semiconductive shield layer covering at least a portion of the insulation layer.

4. The bus connector of claim 1, wherein at least one of the first electrical connector and the second electrical connector comprises a contact probe.

5. The bus connector of claim 1, wherein at least one of the first electrical connector and the second electrical connector comprises a plurality of contact fingers operable to receive a contact probe from a mating electrical connector.

6. The bus connector of claim 1, wherein one of the first and second electrical connectors comprises a contact probe and the other of the first and second electrical connectors comprises a plurality of contact fingers operable to receive a contact probe from a third, mating electrical connector.

7. The bus connector of claim 1, wherein the first electrical connector is associated with a source side of the switchgear, and the second electrical connector is associated with a tap side of the switchgear.

8. The bus connector of claim 1, wherein longitudinal axes of the first and second electrical connectors are substantially parallel with respect to each other.

9. The bus connector of claim 1, further comprising a layer of solid insulation at least partially surrounding the bus bar and at least one of the first and second electrical connectors.

10. The bus connector of claim 9, wherein the layer of solid insulation comprises at least one of rubber and plastic.

11. The bus connector of claim 9, further comprising a semiconductive shield layer covering at least a portion of the layer of solid insulation.

12. A bus connector assembly, comprising:
first and second solid bus bars, each solid bus bar comprising
a first end segment,
a second end segment that is substantially parallel to the first end segment,
a middle segment extending between the first end segment and the second end segment,
a first side comprising a first oblique bend that is disposed proximate the first end segment, the first oblique bend defining a first obtuse angle that extends between an axis of the first end segment and an axis of the middle segment, and
a second side disposed opposite the first side, the second side comprising a second oblique bend that is disposed proximate the second end segment, the second oblique bend defining a second obtuse angle that extends between an axis of the second end segment and an axis of the middle segment, the first and second oblique bends being formed in opposite directions, with substantially equal magnitudes;
a first electrical connector coupled to the first end segment of the first solid bus bar, a mating end of the first electrical connector extending from the second side of the first solid bus bar;
a second electrical connector coupled to the second end segment of the first solid bus bar, a mating end of the second electrical connector extending from the first side of the first solid bus bar;
a third electrical connector coupled to the first end segment of the second solid bus bar, a mating end of the third electrical connector extending from the second side of the second solid bus bar; and
a fourth electrical connector coupled to the second end segment of the second solid bus bar, a mating end of the fourth electrical connector extending from the first side of the second solid bus bar.

13. The bus connector assembly of claim 12, wherein at least a portion of the first end segment of the first solid bus bar is axially aligned with at least a portion of the second end segment of the second solid bus bar.

14. The bus connector assembly of claim 12, wherein at least one of the first electrical connector and the second electrical connector extends perpendicularly away from the first solid bus bar.

15. The bus connector assembly of claim 12, further comprising:
a first insulation layer surrounding the first solid bus bar and the first and second electrical connectors;
a first semiconductive shield layer covering at least a portion of the first insulation layer;
a second insulation layer surrounding the second solid bus bar and the third and fourth electrical connectors; and
a second semiconductive shield layer covering at least a portion of the second insulation layer.

16. The bus connector assembly of claim 12, wherein at least one of the electrical connectors comprises a contact probe.

17. The bus connector assembly of claim 12, wherein at least one of the electrical connectors comprises a plurality of contact fingers operable to receive a contact probe from a mating electrical connector.

18. The bus connector assembly of claim 12, wherein the longitudinal axes of the first and third electrical connectors are substantially parallel with respect to each other.

19. The bus connector assembly of claim 18, wherein the longitudinal axes of the second and fourth electrical connectors are substantially parallel with respect to each other.

20. The bus connector assembly of claim 12, further comprising a layer of solid insulation at least partially surrounding the first solid bus bar and at least one of the first and second electrical connectors.

21. The bus connector assembly of claim 20, further comprising a second layer of solid insulation at least partially surrounding the second solid bus bar and at least one of the third and fourth electrical connectors.

22. The bus connector assembly of claim 20, wherein the layer of solid insulation comprises at least one of rubber and plastic.

23. The bus connector assembly of claim 20, further comprising a semiconductive shield layer covering at least a portion of the layer of solid insulation.

24. The bus connector assembly of claim 12, wherein one of the first and second electrical connectors comprises a contact probe and the other of the first and second electrical connectors comprises a plurality of contact fingers operable to receive a contact probe from a fifth, mating electrical connector.

25. The bus connector assembly of claim 24, wherein one of the third and fourth electrical connectors composes a contact probe and the other of the third and fourth electrical connectors comprises a plurality of contact fingers operable to receive a contact probe from a sixth, mating electrical connector.

26. A bus connector assembly, comprising:
first and second solid bus bars, each solid bus bar comprising
a first end segment,
a second end segment that is substantially parallel to the first end segment,
a middle segment extending between the first end segment and the second end segment,
a first side comprising a first oblique bend that is disposed proximate the first end segment, the first oblique bend defining a first obtuse angle that extends between an axis of the first end segment and axis of the middle segment, and
a second side disposed opposite the first side, the second side comprising a second oblique bend that is disposed proximate the second end segment, the second oblique bend defining a second obtuse angle that extends between an axis of the second end segment and an axis of the middle segment, the first and second oblique bends being formed in opposite directions, with substantially equal magnitudes, at least a portion of the first end segment of the first solid bus bar being axially aligned with at least a portion of the second end segment of the second solid bus bar;
a first electrical connector coupled to the first end segment of the first solid bus bar, a mating end of the first electrical connector extending from the second side of the first solid bus bar;
a second electrical connector coupled to the second end segment of the first solid bus bar, a mating end of the second electrical connector extending from the first side of the first solid bus bar;
a third electrical connector coupled to the first end segment of the second solid bus bar, a mating end of the third electrical connector extending from the second side of the second solid bus bar; and
a fourth electrical connector coupled to the second end segment of the second solid bus bar, a mating end of the fourth electrical connector extending from the first side of the second solid bus bar.

27. The bus connector assembly of claim 26, wherein at least one of the first electrical connector and the second electrical connector extends perpendicularly away from the first solid bus bar.

28. The bus connector assembly of claim 26, wherein the longitudinal axes of the first and third electrical connectors are substantially parallel with respect to each other.

29. The bus connector assembly of claim 26, wherein the longitudinal axes of the second and fourth electrical connectors are substantially parallel with respect to each other.

30. The bus connector assembly of claim 26, further comprising:
a first insulation layer surrounding the first solid bus bar and the first and second electrical connectors;
a first semiconductive shield layer covering at least a portion of the first insulation layer;
a second insulation layer surrounding the second solid bus bar and the third and fourth electrical connectors; and
a second semiconductive shield layer covering at least a portion of the second insulation layer.

31. The bus connector assembly of claim 26, wherein at least one of the electrical connectors comprises a contact probe.

32. The bus connector assembly of claim 26, wherein at least one of the electrical connectors comprises a plurality of contact fingers operable to receive a contact probe from a mating electrical connector.

33. The bus connector assembly of claim 26, further comprising a layer of solid insulation at least partially surrounding the first solid bus bar and at least one of the first and second electrical connectors.

34. The bus connector assembly of claim 33, further comprising a second layer of solid insulation at least partially surrounding the second solid bus bar and at least one of the third and fourth electrical connectors.

35. The bus connector assembly of claim 33, wherein the layer of solid insulation comprises at least one of rubber and plastic.

36. The bus connector assembly of claim 33, further comprising a semiconductive shield layer covering at least a portion of the layer of solid insulation.

37. The bus connector assembly of claim 26, wherein one of the first and second electrical connectors comprises a contact probe and the other of the first and second electrical connectors comprises a plurality of contact fingers operable to receive a contact probe from a fifth, mating electrical connector.

38. The bus connector assembly of claim 37, wherein one of the third and fourth electrical connectors composes a contact probe and the other of the third and fourth electrical connectors comprises a plurality of contact fingers operable to receive a contact probe from a sixth, mating electrical connector.

* * * * *